United States Patent
Wang

(10) Patent No.: US 10,616,804 B2
(45) Date of Patent: Apr. 7, 2020

(54) RADIO COMMUNICATION SYSTEM, BASE STATION DEVICE AND MANAGEMENT METHOD THEREOF

(71) Applicant: Huawei Technologies Co., Ltd., Shenzhen, Guangdong (CN)

(72) Inventor: Shaorui Wang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 146 days.

(21) Appl. No.: 14/279,978

(22) Filed: May 16, 2014

(65) Prior Publication Data

US 2014/0247792 A1 Sep. 4, 2014

Related U.S. Application Data

(63) Continuation of application No. PCT/CN2012/084844, filed on Nov. 19, 2012.

(30) Foreign Application Priority Data

Nov. 18, 2011 (CN) .......................... 2011 1 0369126
Nov. 18, 2011 (CN) .......................... 2011 1 0369130
Nov. 18, 2011 (CN) .......................... 2011 1 0369138

(51) Int. Cl.
*H04L 12/24* (2006.01)
*H04W 28/16* (2009.01)

(52) U.S. Cl.
CPC .................... *H04W 28/16* (2013.01)

(58) Field of Classification Search
USPC ....................................................... 370/329
See application file for complete search history.

(56) References Cited

U.S. PATENT DOCUMENTS 6,374,112 B1 * 4/2002 Widegren ............. H04W 28/18
370/352
8,010,676 B1 8/2011 Battersby et al.
(Continued)

FOREIGN PATENT DOCUMENTS

CN 101427604 A 5/2009
CN 101969391 A 2/2011
(Continued)

OTHER PUBLICATIONS

"C-RAN, The Road Towards Green RAN", China Mobile Research Institute, Oct. 2011, 46 pages.
(Continued)

*Primary Examiner* — Sithu Ko
(74) *Attorney, Agent, or Firm* — Maier & Maier, PLLC

(57) ABSTRACT

A system includes: nodes, configured to provide computing resources and network resources of a base station and virtualize the computing resources and the network resources into logical resources; a switch device, configured to perform data exchange between the nodes; a node management device, configured to form a resource pool and schedule the resources in the resource pool to a cloud based virtual base station for use; a cloud based virtual base station management device, configured to manage and control resources of the cloud based virtual base station; and the cloud based virtual base station, configured to obtain, according to the management of the cloud based virtual base station management device and the scheduling of the node management device, logical resources provided by the nodes, and provide base station services based on the logical resources.

19 Claims, 26 Drawing Sheets

(56) References Cited

U.S. PATENT DOCUMENTS

| | | | | |
|---|---|---|---|---|
| 2008/0020801 A1* | 1/2008 | Fesas | ............... | H04W 28/18 455/561 |
| 2009/0170472 A1* | 7/2009 | Chapin | ............... | H04W 28/18 455/410 |
| 2009/0300210 A1* | 12/2009 | Ferris | ............... | G06F 9/5077 709/235 |
| 2010/0135241 A1* | 6/2010 | Wang | ............... | H04W 16/14 370/329 |
| 2011/0145392 A1* | 6/2011 | Dawson | ............... | G06F 9/5072 709/224 |
| 2014/0310401 A1* | 10/2014 | Thomas | ............... | G06F 9/50 709/224 |
| 2014/0348068 A1* | 11/2014 | Morper | ............... | H04W 88/16 370/328 |

FOREIGN PATENT DOCUMENTS

| | | |
|---|---|---|
| CN | 102012891 A | 4/2011 |
| CN | 102164184 A | 8/2011 |
| CN | 102186181 A | 9/2011 |
| EP | 2395782 A1 | 12/2011 |
| JP | 2007214848 A | 8/2007 |
| JP | 2011-508474 A | 3/2011 |
| KR | 10-2004-0010507 A | 1/2004 |
| WO | WO 2009/071431 A1 | 6/2009 |
| WO | WO 2010/083710 A1 | 7/2010 |
| WO | 2011109968 A1 | 9/2011 |

OTHER PUBLICATIONS

Daisuke Jitsukawa, et al., "C-RAN, Coordinated Multi-Point Transmission in Cloud-based Radio Access Network", Aug. 28, 2012, 2 pages.

Taesang Choi, et al., "Autonomic Management Framework for Cloud-based Virtual Networks", Sep. 23, 2011, 8 pages.

Zhu et al; "Virtual Base Station Pool: Towards a Wireless Network Cloud for Radio Access Networks"; CF '11: Proceedings of the 8th ACM International Conference on Computing Frontiers; Article No. 34; Ischia, Italy; May 3-5, 2011; 10 pages.

VMware "VMware Infrastructure Architecture Overview" Dec. 31, 2006, XP055585970, Retrieved from the Internet: URL: http://www.vmware.com/pdf/vi_wp.pdf. total 14 pages.

European Office Action dated May 15, 2015 in corresponding European Patent Application No. 17166187.9 (7 pages).

* cited by examiner

RADIO COMMUNICATION SYSTEM, BASE STATION DEVICE AND MANAGEMENT METHOD THEREOF

CROSS-REFERENCE TO RELATED APPLICATIONS

This application is a continuation of International Application No. PCT/CN2012/084844, filed on Nov. 19, 2012, which claims priority to Chinese Patent Application No. 201110369126.2, filed on Nov. 18, 2011, Chinese Patent Application No. 201110369130.9, filed on Nov. 18, 2011 and Chinese Patent Application No. 201110369138.5, filed on Nov. 18, 2011, all of which are hereby incorporated by reference in their entireties.

TECHNICAL FIELD

The present invention relates to the radio communication field, and in particular, to a system and method for managing a base station, a radio communication system, a cloud based virtual base station, and a resource scheduling method.

BACKGROUND

In one aspect:

A public mobile communication base station is a form of a radio station, and refers to a radio transceiver station which transfers information with a mobile telephone terminal through a mobile communication switching center within a radio coverage area.

A conventional radio base station system has the following features: Each base station is connected to a fixed number of sectoral antennas and covers a small area; each base station can only process received or transmitted signals of respective cells, and the base stations have strict binding relationships with the areas covered by the base stations; resources cannot be shared between base stations, and when the traffic or signaling flow of a base station keeps increasing, the base station may be faulty because of a too heavy processing load; utilization of resources of the base station system is not high, and on the network, some base stations have a too light service load, while some base stations have a too heavy service load, and resources cannot be scheduled efficiently; capabilities of the conventional base station system can be extended only in a scale-up manner, and the expansion of capabilities is limited, for example, limited by the cost, key chips, and so on; for the conventional base station, a virtual base station and a physical base station are not distinguished, and the base station service is strictly bound with the base station device.

The main design idea for the conventional base station virtualization solution is to virtualize resources of a computing node, for example, virtualize a computing node into one or more computing resources, so that one or more virtual base stations are deployed. This method is mainly intended to fully use computing capabilities in a scenario where capabilities of one computing node are sufficient.

FIG. 1 shows a current hierarchical structure of virtual base stations. This solution is mainly installing a layer of management programs (Hypervisor) on a computing node (for example, a multi-core processor), where the programs complete virtualization of the computing node; and installing multiple guest operating systems (Guest OS) above the layer, where base station software is installed above the Guest OS, and different base stations can share computing capabilities of the node (Node).

A disadvantage of the solution lies in that: When computing capabilities of one Node are insufficient, capabilities of the system become a bottleneck; computing capabilities of the system cannot be extended flexibly, and the performance and capacity of the system are restricted by capabilities of the Node.

In one aspect:

RAN sharing can enable multiple operators to share the access infrastructure of a radio network, so as to realize multiple purposes: saving the management expense (Operating Expense, OPEX) and capital expenditure (Capital Expenditure, CAPEX) in infrastructures for the operators; increasing the profit and revenue of the current operators; lowering the barrier to market entry for emerging operators; shifting competitiveness of the operators from the network infrastructure/deployment to service and innovation capabilities; greatly speeding up network deployment; and constructing an environment-friendly network.

There are mainly two types of conventional RAN Sharing architectures: 1. Different cell resources of a base station (Base Transceiver Station, BTS) device are allocated to different operators, and different operators can adjust cell parameters independently, and perform network optimization independently, thus forming differentiated competitive edges. 2. A same cell resource of a base station device may be shared by multiple operators simultaneously, but the operators cannot independently adjust cell related parameters.

The common feature of the two solutions lies in that more operators share an infrastructure. However, different infrastructure units (for example, BTS) are independent, and their resources cannot be shared mutually, and when a BTS is faulty, services of multiple operators are affected; when the service load of an operator on a BTS becomes heavier, more processing resources are occupied, which may squeeze services of another operator, thus affecting quality of service of other operators.

In another aspect:

A multi-standard (or multimode) base station (Base Transceiver Station, BTS) is a mainstream of development of the base station system, and can effectively reduce the network construction cost of an operator. For example, a multimode base station integrating multiple standards occupies less space, and the multimode base station can be installed in an existing equipment room of the base station, so that capital expenditure (Capital Expenditure, CAPEX) is reduced. In addition, the multimode base station shares the transmission device and main device, and its power consumption is also reduced greatly, so that the management expense (Operating Expense, OPEX) is reduced.

The conventional multi-standard base station mainly has two implementation solutions:

1. Using two standards, universal mobile telecommunications system (Universal Mobile Telecommunications System, UMTS) and long term evolution (Long Term Evolution, LTE), as an example, two independent sets of hardware (main control unit, baseband unit, and transmission unit) are designed; the two sets of hardware respectively provide UMTS and LTE services and are completely isolated from each other, the two completely independent systems are installed in one BTS device.

The main disadvantages of the solution are as follows: It is difficult to support other standards: Due to hardware constraints, a new set of hardware is required for supporting a new standard, and its development cost is very high; it is difficult to support more than two standards: If three standards coexist, three sets of hardware are required, but due to space constraints of the BTS, it is possible that there is no enough space to contain three sets of hardware devices, resulting in nonsupport for three modes.

2. Still using the UMTS and LTE standards as an example, in terms of design, hardware is a public hardware platform (main control unit, baseband unit, and transmission unit), and software is a public software platform; services of different standards may run on the public software platform simultaneously.

Compared with solution 1, this solution has a great progress, but also has a disadvantage: In a scenario where multiple standards are concurrent, when services of different standards contend for a same set of hardware resources, the service of one standard may be damaged; when hardware of the BTS is faulty, services of both standards may be damaged and cannot be recovered.

Between solution 1 and solution 2, there are also multiple transitional solutions (for example, sharing of the main control hardware and separation of baseband hardware), which also have the above problems.

SUMMARY

In one aspect:

The technical problem to be solved by embodiments of the present invention is to provide a system and method for managing a base station, so that resources of multiple nodes can be shared in the base station system.

To solve the above technical problem, an embodiment of the present invention provides a system for managing a base station, where the system includes:

nodes, configured to provide computing resources and network resources and virtualize the computing resources and the network resources into logical resources;

a switch device, configured to perform data exchange between the nodes;

a node management device, configured to obtain information of the logical resources of the nodes, form a resource pool according to the information of the logical resources, and schedule, based on the data exchange of the switch device, corresponding logical resources in the resource pool to a cloud based virtual base station for use;

a cloud based virtual base station management device, configured to manage resources of the cloud based virtual base station according to the resource pool; and the cloud based virtual base station, configured to obtain the logical resources according to the management of the cloud based virtual base station management device and the scheduling of the node management device, and provide base station services based on the logical resources.

Correspondingly, an embodiment of the invention provides a node management device, including:

a registering unit, configured to: after nodes managed by the node management device are started, obtain registration of the nodes, where the registration means that the nodes, after being started, virtualize their computing resources and network resources into logical resources and register information of the logical resources with the node management device; and a resource management unit, configured to form a resource pool according to the information of the logical resources which is obtained by the registering unit, where the resource pool records function description of the logical resources and address information nodes of which providing the logical resources.

An embodiment of the invention provides a cloud based virtual base station management device includes:

a creation requesting unit, configured to apply for management control resources from a node management device after a request for creating a cloud based virtual base station is received, and after the application is successful, request a node where the management control resources are located to create a cloud based virtual base station, so that the node where the management control resources are located creates a cloud based virtual base station according to the request for creating a cloud based virtual base station.

In addition, an embodiment of the present invention further provides a method for managing a base station, where the method is used in the above base station system and includes:

obtaining, by a node management device after nodes are started, registration of the nodes, where the registration means that the nodes, after being started, virtualize their computing resources and network resources into logical resources and register information of the logical resources with the node management device; and forming, by the node management unit, a resource pool according to the registered information of the logical resources, where the resource pool records function description of the logical resources and address information nodes of which providing the logical resources.

An embodiment of the present invention further provides a method for managing a base station, where the method is used in the above base station system and includes:

receiving, by a cloud based virtual base station management device, a request for creating a cloud based virtual base station; and applying, by the cloud based virtual base station management device, for management control resources from a node management device, and after the application is successful, requesting a node where the management control resources are located to create a cloud based virtual base station, so that the node where the management control resources are located creates a cloud based virtual base station according to the request for creating a cloud based virtual base station.

In the embodiments of the present invention, physical resources of multiple nodes are virtualized into logical resources, and the logical resources are allocated to multiple cloud based virtual base stations for use through a resource pool, so that the base station system can implement resource capability sharing for multiple nodes; in addition, corresponding management devices are arranged in the base station system to perform resource scheduling, which improves efficiency and flexibility of resource use.

In one aspect:

The technical problem to be solved by embodiments of the present invention is to provide a radio communication system, a cloud based virtual base station, and a resource scheduling method, so that effective allocation of base station device resources can be improved when RAN Sharing is provided.

To solve the above technical problem, an embodiment of the present invention provides a radio communication system, including:

a cloud based virtual base station platform, configured to virtualize base station physical resources of nodes at a physical layer into logical resources of a resource layer, and schedule, at a resource scheduling layer, the logical resources provided by the resource layer to a cloud based virtual base station, where the base station physical resources include node computing resources and node network resources;

the cloud based virtual base station, configured to provide base station services to one or more operators based on the logical resources scheduled by the cloud based virtual base station platform; and a cloud based virtual base station management device, configured to manage the cloud based virtual base station.

Correspondingly, an embodiment of the present invention further provides a cloud based virtual base station, including:

a resource obtaining unit, configured to request corresponding logical resources from a resource scheduling layer of a cloud based virtual base station platform according to service requirements, so that the cloud based virtual base station platform schedules the logical resources to the cloud based virtual base station for use according to the request of the cloud based virtual base station through scheduling of the resource scheduling layer, where the logical resources are logical resources of a resource layer scheduled at the resource scheduling layer into which the cloud based virtual base station platform virtualizes base station physical resources of nodes at a physical layer; and a service providing unit, configured to provide base station services to one or more operators based on the logical resources scheduled by the cloud based virtual base station platform.

An embodiment of the present invention further provides a resource scheduling method, where the method is used in the above system and includes:

requesting, by a cloud based virtual base station, corresponding logical resources from a resource scheduling layer of a cloud based virtual base station platform according to service requirements, so that the cloud based virtual base station platform schedules the logical resources to the cloud based virtual base station for use according to the request of the cloud based virtual base station through scheduling of the resource scheduling layer, where the logical resources are logical resources of a resource layer scheduled at the resource scheduling layer into which the cloud based virtual base station platform virtualizes base station physical resources of nodes at a physical layer, and providing, by the cloud based virtual base station, base station services to one or more operators based on the logical resources scheduled by the cloud based virtual base station platform.

In the embodiments of the present invention, base station physical resources are virtualized into logical resources through the cloud based virtual base station platform and are provided to multiple cloud based virtual base stations; when the base station physical resources are faulty or resource requirements of the cloud based virtual base station increase, allocation of resources can be effectively implemented through the cloud based virtual base station platform, and security and effectiveness of resource sharing can be improved.

In still another aspect:

The technical problem to be solved by embodiments of the present invention is to provide a radio communication system, a cloud based virtual base station, and a resource scheduling method. A multi-standard base station system may be provided.

To solve the above technical problem, an embodiment of the present invention provides a radio communication system, including:

a cloud based virtual base station platform, configured to virtualize base station physical resources of nodes at a physical layer into logical resources of a resource layer, and schedule, at a resource scheduling layer, the logical resources provided by the resource layer to a cloud based virtual base station, where the base station physical resources include node computing resources and node network resources, and the cloud based virtual base station is a cloud based virtual base station having different standards;

the cloud based virtual base station, configured to provide base station services of predetermined standards based on the logical resources scheduled by the cloud based virtual base station platform; and a cloud based virtual base station management device, configured to manage the cloud based virtual base station.

Correspondingly, an embodiment of the present invention further provides a cloud based virtual base station, where the cloud based virtual base station is a cloud based virtual base station having a predetermined standard and includes:

a resource obtaining unit, configured to request corresponding logical resources from a resource scheduling layer of a cloud based virtual base station platform according to service requirements, so that the cloud based virtual base station platform schedules the logical resources to the cloud based virtual base station for use according to the request of the cloud based virtual base station through scheduling of the resource scheduling layer, where the logical resources are logical resources of a resource layer scheduled at the resource scheduling layer into which the cloud based virtual base station platform virtualizes base station physical resources of nodes at a physical layer, and a service providing unit, configured to provide base station services of the predetermined standard based on the logical resources scheduled by the cloud based virtual base station platform.

An embodiment of the present invention further provides a resource scheduling method, including:

requesting, by a cloud based virtual base station, corresponding logical resources from a resource scheduling layer of a cloud based virtual base station platform according to service requirements, so that the cloud based virtual base station platform schedules the logical resources to the cloud based virtual base station for use according to the request of the cloud based virtual base station through scheduling of the resource scheduling layer, where the cloud based virtual base station is a cloud based virtual base station having different standards, and the logical resources are logical resources of a resource layer scheduled at the resource scheduling layer into which the cloud based virtual base station platform virtualizes base station physical resources of nodes at a physical layer; and providing, by the cloud based virtual base station having different standards, base station services of predetermined standards based on the logical resources scheduled by the cloud based virtual base station platform.

In the embodiments of the present invention, base station physical resources are virtualized into logical resources through the cloud based virtual base station platform and are provided to multiple cloud based virtual base stations having different standards; when the base station physical resources are faulty or resource requirements of the cloud based virtual base station increase, allocation of resources can be effectively implemented through the cloud based virtual base station platform, and security and effectiveness of resource sharing can be improved.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from the accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In one aspect:

An embodiment of the present invention provides a virtual base station based on cloud computing, which can implement sharing of computing capabilities and network capabilities between mass nodes (Node). The overall computing capabilities and network capabilities of the system can be extended dynamically and flexibly according to traffic, which can well adapt to the scenario of a temporary heavy traffic impact.

Figure 1:
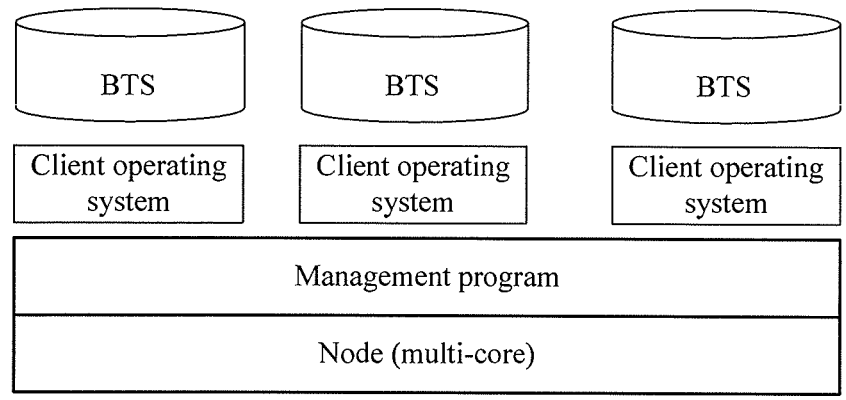
FIG. 1 is a schematic hierarchical structural diagram of virtual base stations in a conventional infrastructure.
Figure 2:
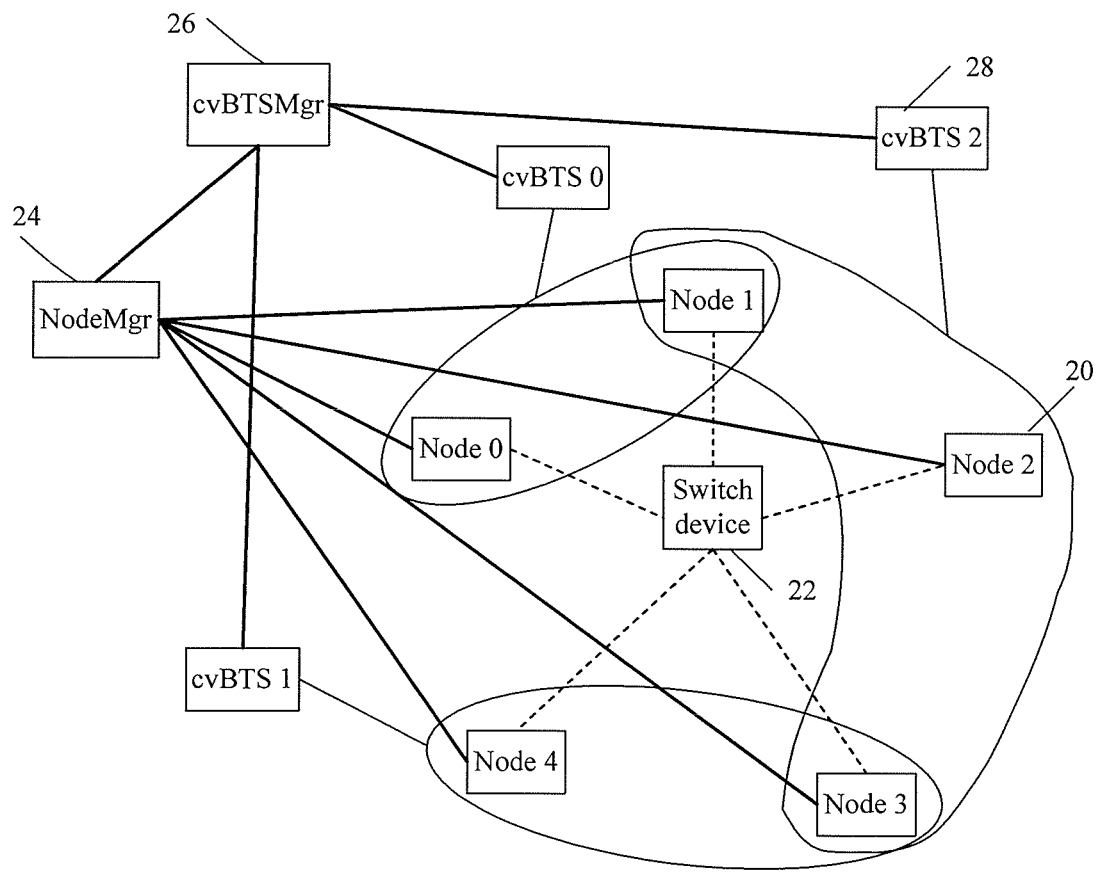
FIG. 2 is a schematic diagram of specific composition of a system for managing a base station according to an embodiment of the present invention.

FIG. 2 is a schematic diagram of specific composition of a system for managing a base station according to an embodiment of the present invention. The system includes the following five parts.

One or more nodes (Node) 20 are 5 nodes in FIG. 2: node 0, node 1, node 2, node 3, and node 4, which are configured to provide computing resources and network resources of the base station, and virtualize the computing resources and network resources into logical resources.

The logical resources include management control resources, signaling resources, baseband resources, and transmission resources. Therefore, the computing resources and network resources can be correspondingly virtualized into management control resources, signaling resources, baseband resources, and transmission resources. Of course, categories of logical resources may also be added or changed according to requirements of specific services, which is not further described herein. The node may be homogeneous or heterogeneous, for example, a PC may be a Node, and a base transceiver station (Base Transceiver Station, BTS) may be a Node; the Node in the embodiment of the present invention may be any device that has computing capabilities, that is, any one of the above 5 nodes is a computer, a base transceiver station, or other devices that have computing capabilities.

A switch device 22 is configured to perform data exchange between the nodes. In the embodiment of the present invention, the switch device (switch) may be any device capable of data exchange; there may be multiple Switches in the system, and multiple Switches may be networked to form a complex topology.

A node management device (NodeMgr) 24 is configured to obtain information of logical resources of the nodes managed by the node management device, form a resource pool according to the information of the logical resources by using the logical resources of the nodes managed by the node management device, and based on data exchange of the switch device, schedule the corresponding logical resources in the resource pool to the cloud based virtual base station for use.

The node management device may be deployed on any one of the multiple nodes, or separately deployed on an independent server. If the node management device is deployed on a node, information exchange between the node management device and each node may be implemented through the above switch device; if the node management device is deployed on an independent server, the node management device may also be connected to the switch device, and information exchange between the node management device and each node may be implemented through the above switch device. Of course, the node management device may also be connected to a part or all of the nodes to implement direct or indirect information exchange.

A cloud based virtual base station management device (cvBTSMgr) 26 is configured to manage and control resources of the cloud based virtual base station (Cloud based virtual BTS, cvBTS) according to the information of the resource pool provided by the node management device.

The cloud based virtual base station management device may be deployed on any one of the multiple nodes, or deployed with the node management device together, or separately deployed on an independent server.

Similarly, if the cloud based virtual base station management device is deployed on a node, information exchange between the cloud based virtual base station management device and each node may be implemented through the above switch device; if the cloud based virtual base station management device is deployed on an independent server, the cloud based virtual base station management device may also be connected to the switch device, and information exchange between the cloud based virtual base station management device and each node may be implemented through the above switch device. Of course, the cloud based virtual base station management device may also be connected to a part or all of the nodes to implement direct or indirect information exchange.

One or more cloud based virtual base stations (cvBTS) 28 are configured to obtain the logical resources according to the management of the cloud based virtual base station management device and the scheduling of the node management device, and provide base station services based on the logical resources. FIG. 2 shows 3 cvBTSs, which are cvBTS 0, cvBTS 1, and cvBTS 2, respectively. Resources of each cvBTS are provided by nodes in a circle that are associated with the cvBTS, for example, in this embodiment, resources of cvBTS 0 are provided by node 0 and node 1. The cvBTS 0 is managed by cvBTSMgr 4, and node 0 and node 1 are managed by NodeMgr 3, and other explanations are similar.

Of course, the number of devices in this embodiment is not limited by that shown in FIG. 2. There may be multiple possibilities, which are not further described herein.

The cloud based virtual base station may be deployed across the Nodes. Logical resources of one cloud based virtual base station may come from one or more Nodes; logical resources of one Node may also be allocated to one or more cloud based virtual base stations for use. Generally, the cloud based virtual base station is deployed on a node, and a resource management module of the cloud based virtual base station may be deployed on the node which provides management control resources, while logical resources of the cloud based virtual base station may come from each node, where the resource management module of the cloud based virtual base station is configured to manage and control the logical resources of the cloud based virtual base station.

As shown in FIG. 2, the cloud based virtual base station cvBTS 0 uses resources of Node 0 and Node 1, cvBTS 1 uses resources of Node 3 and Node 4, and cvBTS 2 uses resources of Node 1, Node 2, and Node 3.

Figure 3:
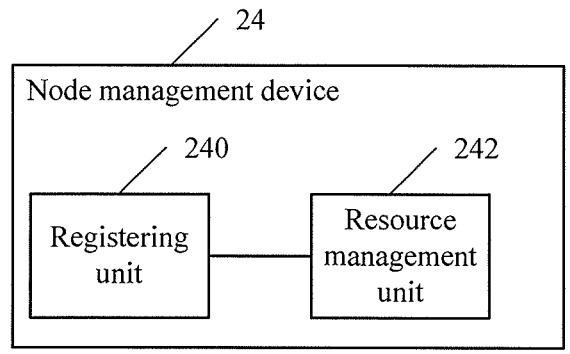
FIG. 3 is a schematic diagram of specific composition of a node management device according to an embodiment of the present invention.

The node management device 24 and cloud based virtual base station management device 26 may also have the following composition. FIG. 3 is a schematic diagram of composition of the node management device 24 according to an embodiment of the present invention, where the node management device 24 includes: a registering unit 240, configured to: after nodes managed by the node management device are started, obtain registration of the nodes, where the registration means that the nodes, after being started, virtualize their computing resources and network resources into logical resources and register information of the logical resources with the node management device; and a resource management unit 242, configured to form a resource pool according to the information of the logical resources which is obtained by the registering unit, where the resource pool records function description of the logical resources and address information nodes of which providing the logical resources.

Further, the resource management unit 242 may be configured to:

provide management control resource information to the cloud based virtual base station management device when the cloud based virtual base station management device receives a request for creating a cloud based virtual base station, so that a node where the management control resources are located creates a cloud based virtual base station according to a corresponding request;

when detecting that a node exits, delete information of logical resources provided by the node that exits in the resource pool, and notify the cloud based virtual base station management device that the resources provided by the node that exits are unavailable, or when receiving a resource release request sent by the cloud based virtual base station management device, delete information of logical resources provided by the node that exits in the resource pool; and return information of corresponding logical resources to the cloud based virtual base station management device when receiving a resource application request of the cloud based virtual base station management device.

Figure 4A:
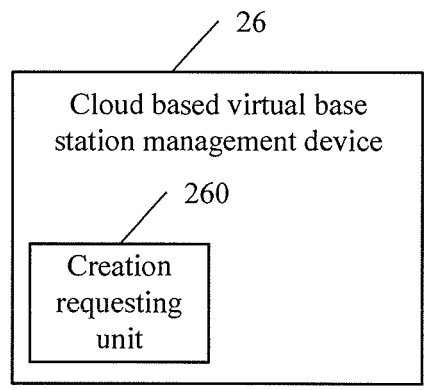
FIG. 4a is a schematic diagram of specific composition of a cloud based virtual base station management device according to an embodiment of the present invention.
Figure 4B:
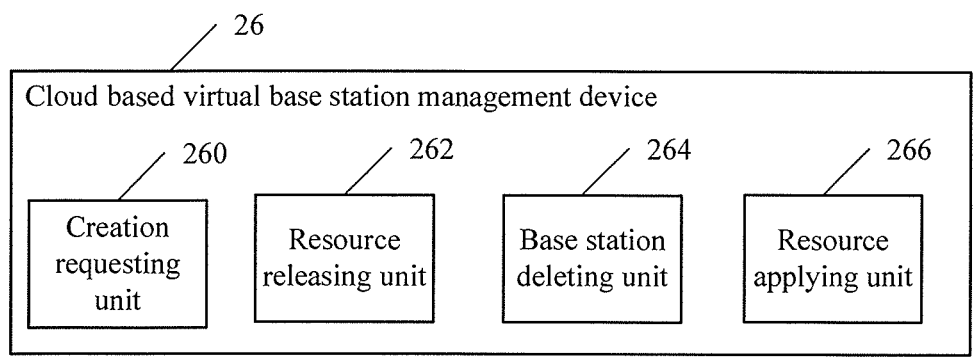
FIG. 4b is another schematic diagram of specific composition of a cloud based virtual base station management device according to an embodiment of the present invention.

FIG. 4*a* is a schematic diagram of composition of the cloud based virtual base station management device 26 according to an embodiment of the present invention, where the cloud based virtual base station management device 26 includes: a creation requesting unit 260, configured to apply for management control resources from a node management device after a request for creating a cloud based virtual base station is received, and after the application is successful, request a node where the management control resources are located to create a cloud based virtual base station, so that the node where the management control resources are located creates a cloud based virtual base station according to the request for creating a cloud based virtual base station;

or as shown in FIG. 4*b*, the cloud based virtual base station management device 26 further includes: a resource releasing unit 262, configured to: when a node exits, according to a notification of the node management device, record that resources provided by the node that exits are unavailable, or when the cloud based virtual base station detects that a service is lower than a load threshold, receive a resource release application sent by the cloud based virtual base station, and notify, according to the resource release application, the node management device of releasing corresponding logical resources;

a base station deleting unit 264, configured to: when receiving a request for deleting a cloud based virtual base station, notify a node which creates the cloud based virtual base station of deleting the cloud based virtual base station, and after a notification of releasing logical resources of the cloud based virtual base station is received from the node which creates the cloud based virtual base station, delete locally stored logical resource information of the cloud based virtual base station; and a resource applying unit 266, configured to: when the cloud based virtual base station detects a service is overloaded, receive a resource application sent by the cloud based virtual base station, apply for logical resources from the node management device according to a locally stored resource scheduling policy, and after information of the applied logical resources returned by the node management device is received, notify the cloud based virtual base station.

Figure 5:
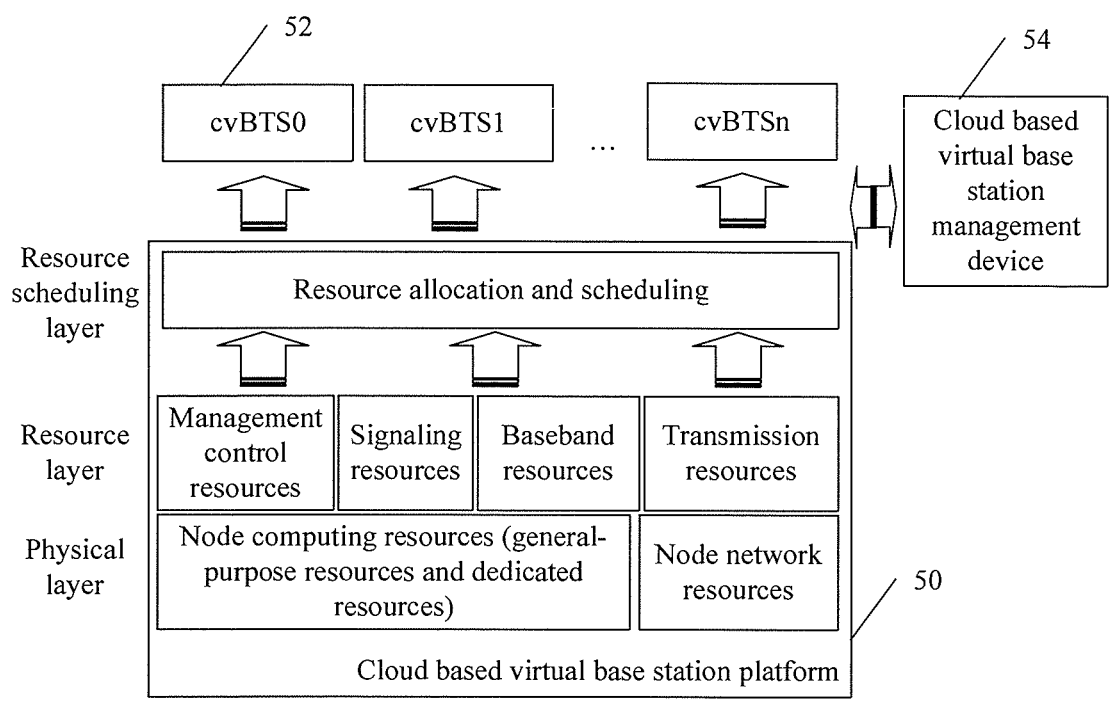
FIG. 5 is a schematic diagram of specific composition of a radio communication system according to an embodiment of the present invention.

FIG. 5 is a schematic diagram of composition of a radio communication system according to an embodiment of the present invention, where the radio communication device includes three parts.

A cloud based virtual base station platform 50 is configured to virtualize computing resources and network resources of multiple nodes at a physical layer into logical resources of a logical layer, and schedule, at a resource scheduling layer, the logical resources provided by the resource layer to different cloud based virtual base stations.

To be specific, the cloud based virtual base station platform may be divided into three layers: a physical layer, a resource layer, and a resource scheduling layer.

Physical layer: Resources of the physical layer are computing resources and network resources of mass Nodes. Computing resources of each Node may include two parts: One part is general-purpose computing resources (resources which can reflect computing capabilities such as CPU processing capabilities on the Node, memory capacity, and Cache capacity); the other part is dedicated computing resources (computing resources of dedicated chips such as the DSP, FPGA, ASIC, and SOC on the Node).

Resource layer: Resources of the resource layer are resources carried on the Node for processing various specific tasks, for example, management control resources, signaling resources, transmission resources, and baseband processing resources. Resources of the resource layer are a further abstraction of resources of the physical layer, that is, services are provided to an upper layer after resources of the physical layer are virtualized into logical resources.

Resource scheduling layer: The resource scheduling layer allocates, according to a resource scheduling policy, the resources provided by the resource layer to each cvBTS. Resources used by the cvBTS may come from multiple Nodes, and herein the specific resource scheduling algorithm is not restricted.

Corresponding to the system topology structure in FIG. 2, in the hierarchical architecture of this embodiment:

Resources of the physical layer of the cloud based virtual base station platform are provided by multiple nodes, where any node among the multiple nodes is a computer, a base transceiver station, or other devices that have computing capabilities.

Functions of the resource scheduling layer of the cloud based virtual base station platform are provided by the node management device, where the node management device is deployed on any one of the multiple nodes, or the node management device is separately deployed on an independent server.

Cloud based virtual base stations 52 (cvBTS 0, cvBTS 1, . . . , cvBTS n in FIG. 5) provide base station services based on the logical resources scheduled by the cloud based virtual base station platform 50.

A cloud based virtual base station management device 54 is configured to manage multiple cloud based virtual base stations 52. Likewise, the cloud based virtual base station management device is deployed on any one of the multiple nodes, or the cloud based virtual base station management device and the node management device are deployed together, or the cloud based virtual base station management device is separately deployed on an independent server. FIG. 5 does not illustrate the contact between the cloud based virtual base station management device 54 and the cvBTS and cloud based virtual base station platform. The specific contact may refer to the relationship between the cvBTSMgr and the cvBTS in FIG. 2, and the relationship between the cloud based virtual base station management device 54 and the cloud based virtual base station platform 50 may refer to the relationship between the cvBTSMgr and the NodeMgr and Node in FIG. 2.

The main purpose of this embodiment is to describe the hierarchical structure of cloud based virtual base stations implemented in the system. From the above description, it is understandable that a cloud based virtual base station in this embodiment of the present invention has capabilities of three aspects:

Interfaces of the cloud based virtual base station: Interfaces provided by the cloud based virtual base station to external service network elements completely comply with the standard protocols (for example, NBAP and S1). An external service network element cannot identify whether the base station is a cloud based virtual base station or a conventional base station.

Logical resources: Resources used by the cloud based virtual base station may come from any Node in the cloud, and resources used by the cloud based virtual base station may be virtualized into four categories: management control resources, signaling resources, transmission resources, and baseband processing resources. Of course, categories of logical resources may also be added or changed according to requirements of specific services, which is not further described herein.

Scheduling algorithms: Resource scheduling algorithms, L1/L2/L3 processing algorithms, and so on, used in the cloud based virtual base station may refer to various resource scheduling algorithms, network topology algorithms, and so on in the radio communication field, and are not further described herein.

As seen from the above description, the essential difference between the cloud based virtual base station and the conventional virtual base station lies in that the resources used by the cloud based virtual base station may come from any Node in the cloud, and that the cloud based virtual base station may dynamically apply for and release resources according to service load conditions, thus implementing flexible expansion of resources. However, the conventional virtual base station can only use resources in one Node, which cannot implement flexible expansion of resources.

Figure 6:
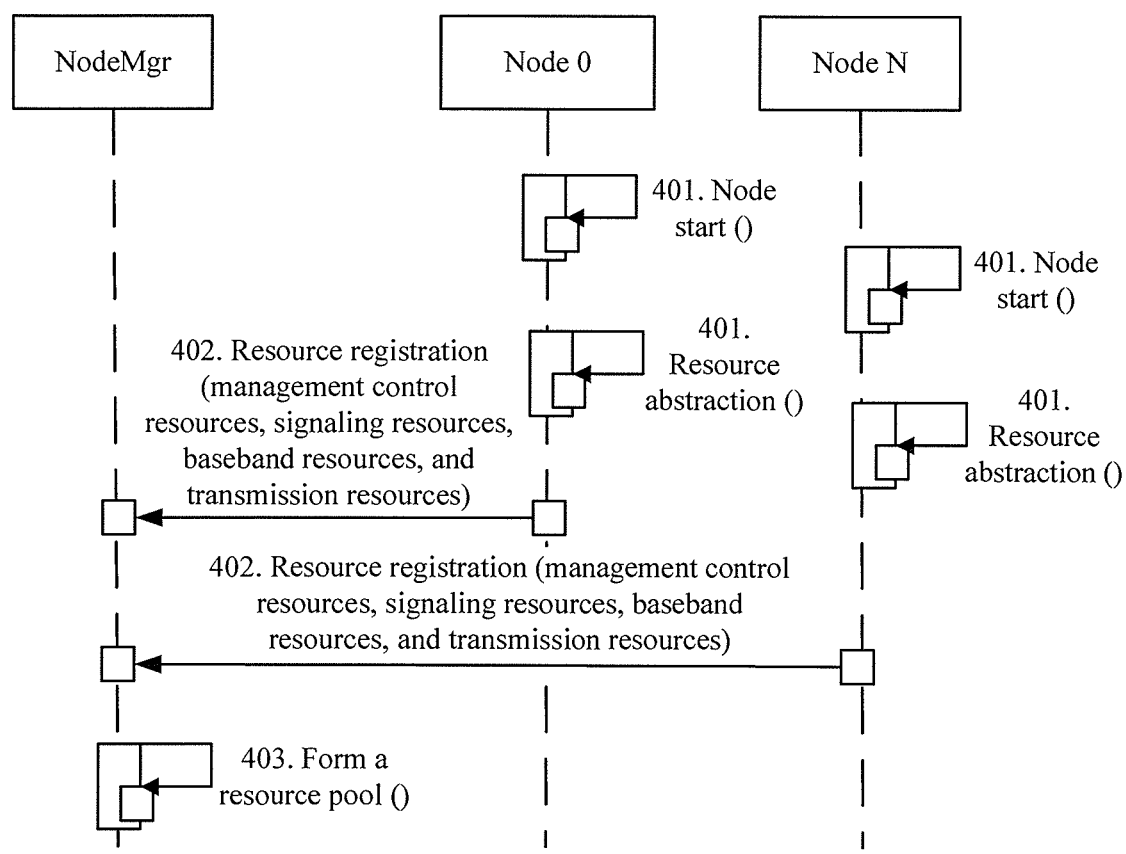
FIG. 6 is a schematic diagram of a resource virtualization and registration process in a method for managing a base station according to an embodiment of the present invention.

Corresponding to the above system architecture, an embodiment of the present invention further provides a method for managing a base station, used in the above base station system. As shown in FIG. 6, the method includes a resource virtualization and registration process. In this embodiment, two nodes are used as examples for description.

401. Nodes are started, and after being started, virtualize their computing resources and network resources into logical resources. This embodiment illustrates the case of two nodes: Node 0 and Node N. Of course, the two nodes may be started simultaneously or sequentially.

402. The nodes register information of the logical resources with a node management device.

403. The node management device forms a resource pool by using the registered information of the logical resources, where the resource pool records function description of the logical resources and address information nodes of which providing the logical resources.

Figure 7:
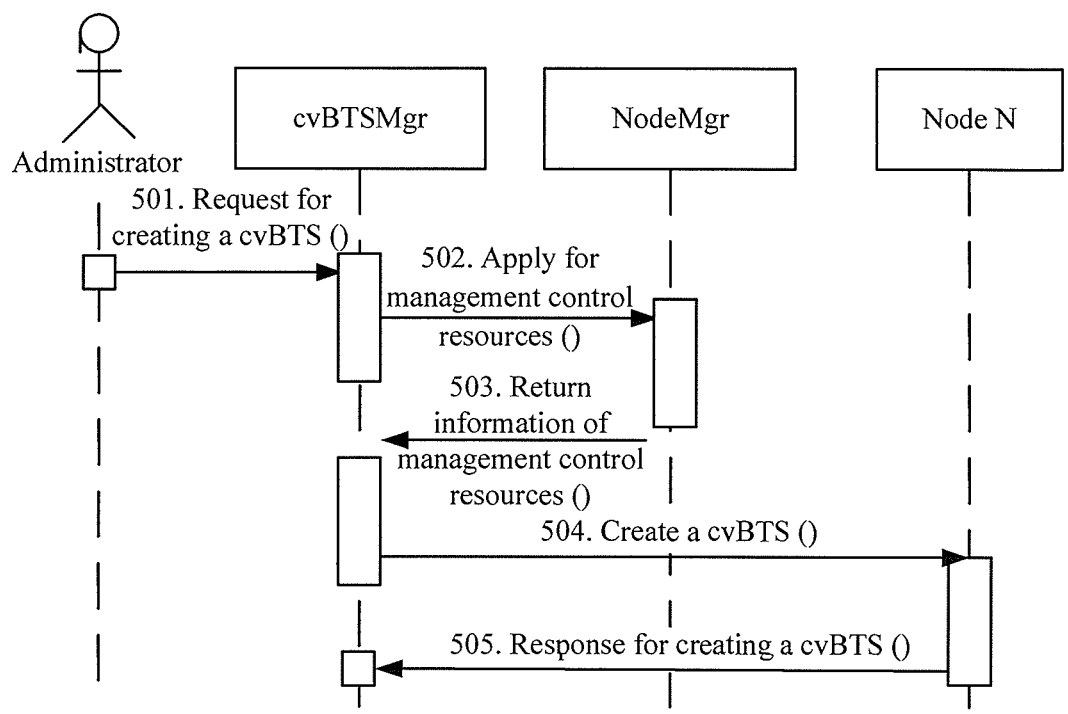
FIG. 7 is a schematic diagram of a process of creating a cloud based virtual base station in a method for managing a base station according to an embodiment of the present invention.

The logical resources include management control resources, signaling resources, baseband resources, and transmission resources. As shown in FIG. 7, the method in this embodiment of the present invention further includes a process of creating a cloud based virtual base station:

501. An administrator (Actor) sends a request for creating a cloud based virtual base station to a cloud based virtual base station management device.

502. The cloud based virtual base station management device applies for management control resources from the node management device after receiving the request for creating a cloud based virtual base station.

503. After receiving a management control resource application of the cloud based virtual base station management device, the node management device provides information of the management control resources to the cloud based virtual base station management device according to the application.

504. After the application is successful (namely, after the information of the management control resources is received successfully), the cloud based virtual base station management device requests the node where the management control resources are located to create a cloud based virtual base station.

505. The node where the management control resources are located creates a cloud based virtual base station according to the request for creating a cloud based virtual base station, and returns a response.

Figure 8:
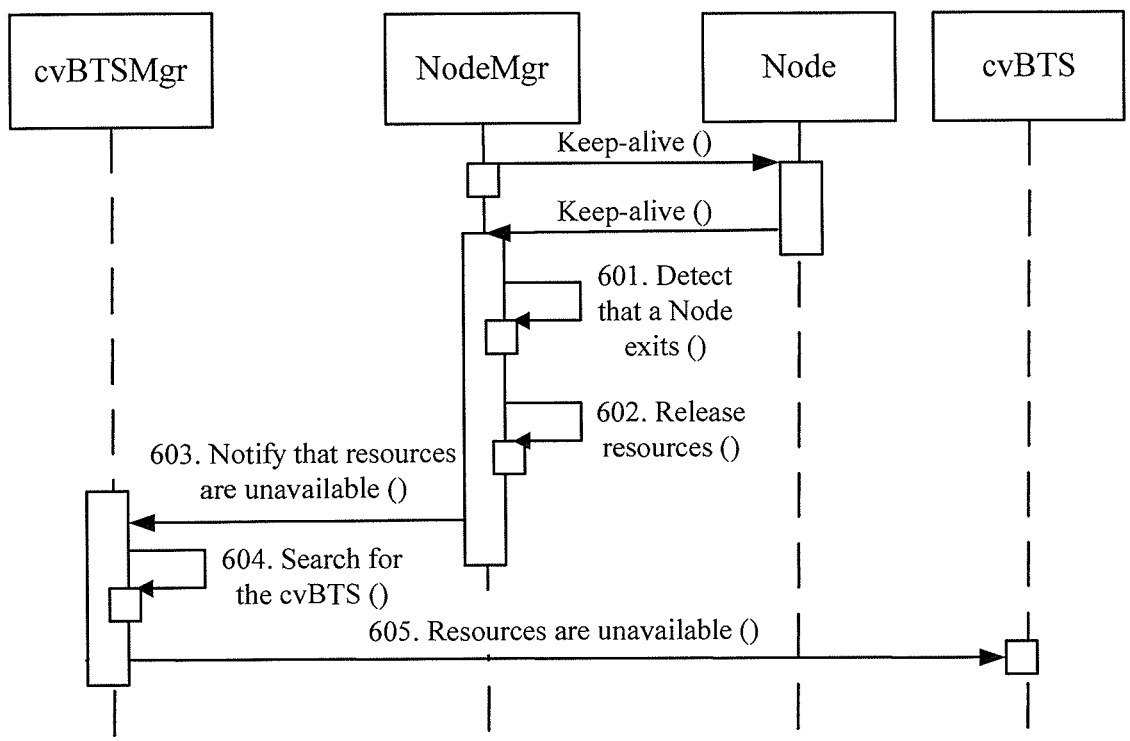
FIG. 8 is a schematic diagram of a process of deleting a node in a method for managing a base station according to an embodiment of the present invention.

As shown in FIG. 8, the method in this embodiment of the present invention further includes a process of deleting a node.

601. A node management device detects that a node exits.

602. A node management device releases the resources provided by the node that exits in the resource pool.

603. Notify a cloud based virtual base station management device that the resources provide by the node that exits are unavailable.

604. The cloud based virtual base station management device searches, according to the notification, for the cloud based virtual base station which uses the resources provided by the node that exits.

605. The cloud based virtual base station management device notifies the cloud based virtual base station that the resources provide by the node that exits are unavailable.

Figure 9:
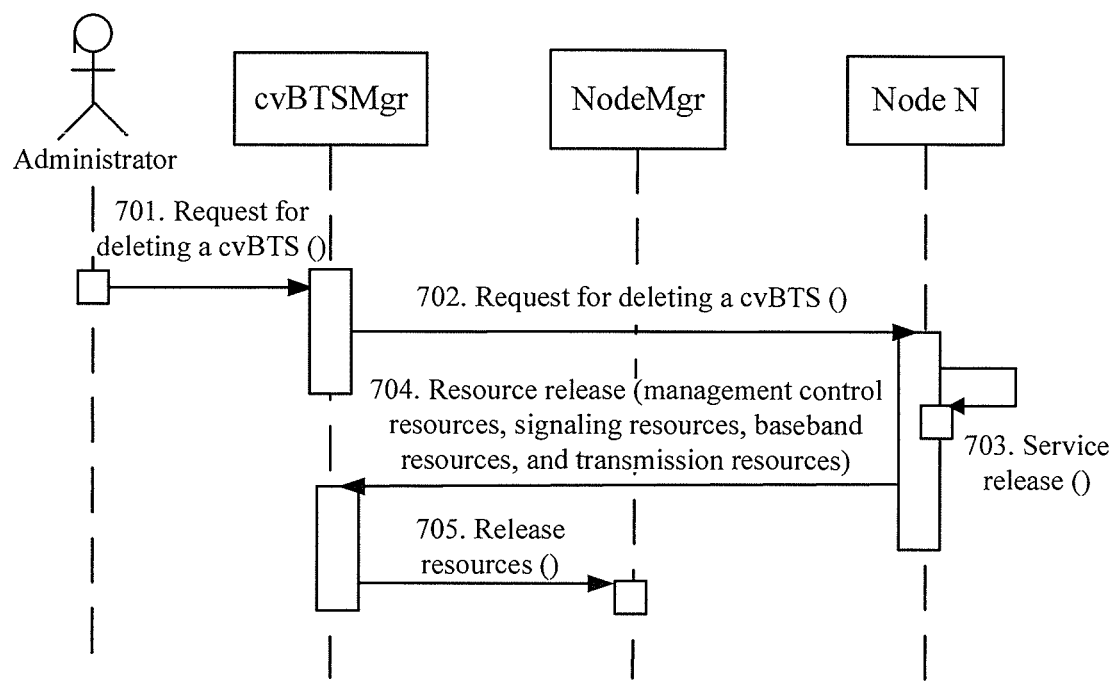
FIG. 9 is a schematic diagram of a process of deleting a cloud based virtual base station in a method for managing a base station according to an embodiment of the present invention.

As shown in FIG. 9, the method in this embodiment of the present invention further includes a process of deleting a cloud based virtual base station:

701. An administrator sends a request for deleting a cloud based virtual base station to a cloud based virtual base station management device.

702. The cloud based virtual base station management device notifies the node which creates the cloud based virtual base station of deleting the cloud based virtual base station.

703. The node which creates the cloud based virtual base station locally releases service resources of the cloud based virtual base station.

704. The node notifies the cloud based virtual base station management device of releasing the logical resources of the cloud based virtual base station.

705. The cloud based virtual base station management device notifies the node management device of releasing the logical resources of the cloud based virtual base station in the resource pool.

Figure 10:
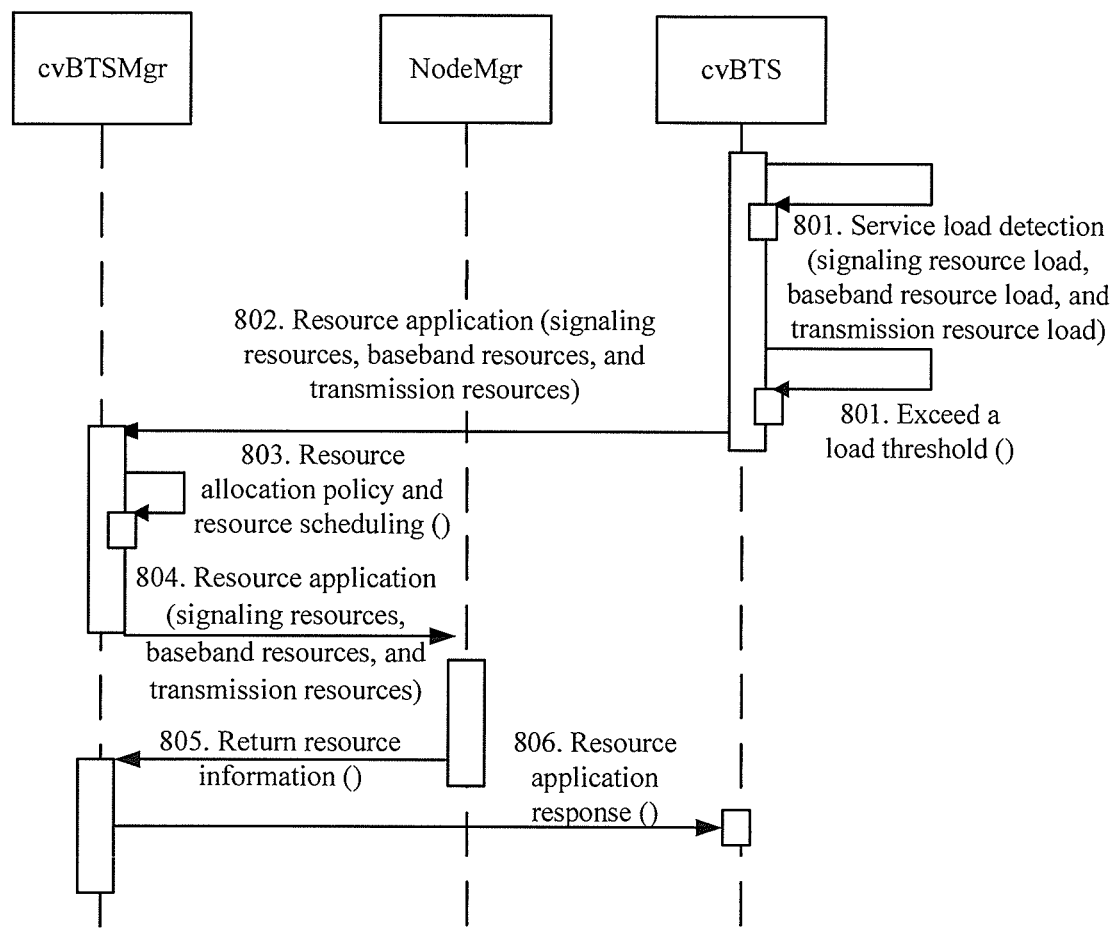
FIG. 10 is a schematic diagram of a process of applying for new resources by a cloud based virtual base station in a method for managing a base station according to an embodiment of the present invention.

As shown in FIG. 10, the method in this embodiment of the present invention further includes a process of applying for new resources by a cloud based virtual base station:

801. A cloud based virtual base station performs service load detection, and detects a service is overloaded, for example, it detects that a service exceeds a load threshold.

802. The cloud based virtual base station applies for resources from the cloud based virtual base station management device.

803. A cloud based virtual base station management device generates a resource application request according to a locally stored resource scheduling policy.

804. The cloud based virtual base station management device applies for logical resources from the node management device.

805. Receive information of the applied logical resources which is returned by the node management device.

806. The cloud based virtual base station management device returns a resource application response to the cloud based virtual base station.

Figure 11:
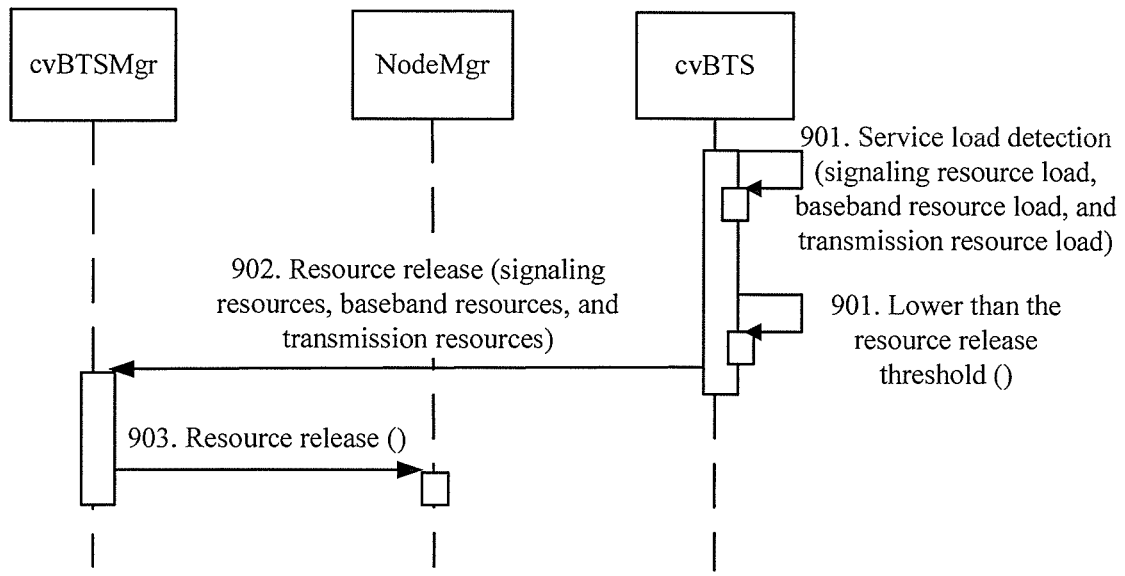
FIG. 11 is a schematic diagram of a process of releasing resources by a cloud based virtual base station in a method for managing a base station according to an embodiment of the present invention.

As shown in FIG. 11, the method in this embodiment of the present invention further includes a process of releasing resources by a cloud based virtual base station:

901. A cloud based virtual base station performs service load detection, and detects that a service is lower than a resource release threshold.

902. The cloud based virtual base station sends a resource release application to a cloud based virtual base station management device.

903. The cloud based virtual base station management device notifies, according to the resource release application, the node management device of releasing corresponding logical resources.

To conclude, it is understandable that the embodiments of the present invention provide a method for constructing a virtual base station, which can implement sharing of computing capabilities between mass Nodes. Therefore, the overall computing capabilities of the system can be dynamically and flexibly extended and reduced according to traffic, which can well adapt to the scenario of a temporary heavy traffic impact, and power consumption of the system is reduced when few services are carried out.

In one aspect:

An embodiment of the present invention provides a RAN Sharing solution based on a cloud based virtual base station platform and a cloud based virtual base station (Cloud based virtual BTS, cvBTS), so that multiple operators can share computing capabilities between mass base station physical resources (such as nodes). Therefore, the overall computing capabilities of the system can be dynamically and flexibly extended according to traffic of each cloud based virtual base station, which can well adapt to the scenario of a temporary heavy traffic impact.

Figure 12:
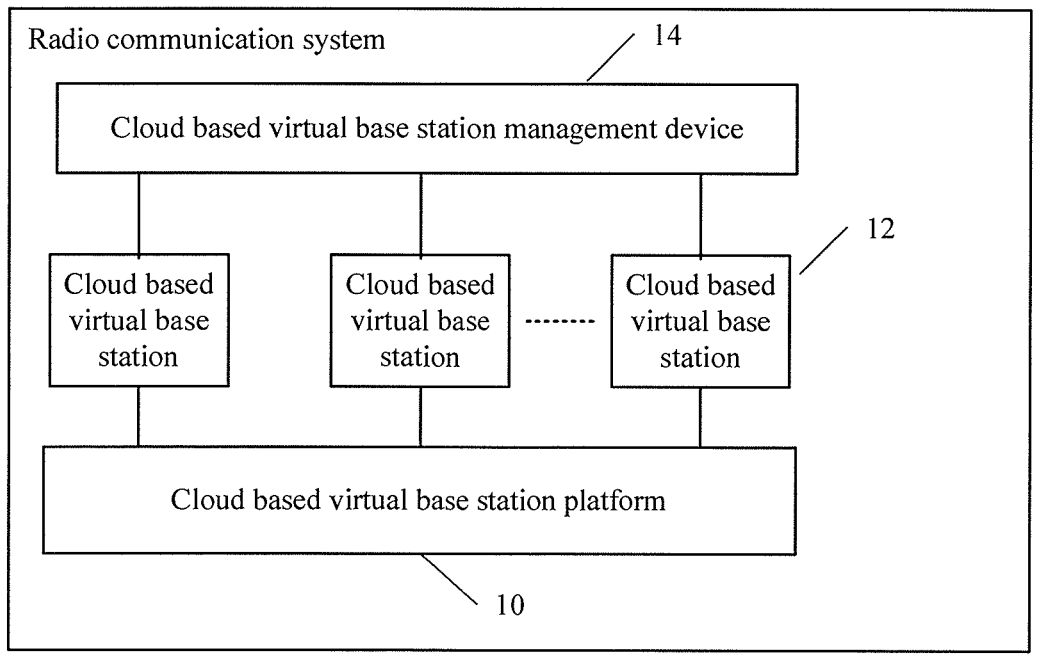
FIG. 12 is a schematic diagram of specific composition of a radio communication system according to an embodiment of the present invention.

FIG. 12 is a schematic diagram of specific composition of a radio communication system according to an embodiment of the present invention. The device 1 includes: a cloud based virtual base station platform 10, configured to virtualize base station physical resources of nodes at a physical layer into logical resources of a resource layer, and schedule, at a resource scheduling layer, the logical resources provided by the resource layer to a cloud based virtual base station, where the base station physical resources include node computing resources and node network resources; a cloud based virtual base station 12, configured to provide base station services to one or more operators based on the logical resources scheduled by the cloud based virtual base station platform 10; and a cloud based virtual base station management device 14, configured to manage the cloud based virtual base station.

To mark the operator to which services are provided by the cloud based virtual base station, the cloud based virtual base station may include an operator identifier, and the cloud based virtual base station provides base station services to an operator according to the operator identifier. To be specific, an attribute is added to the cloud based virtual base station: an operator identifier of the cloud based virtual base station: OperatorId. A schematic typical operation of adding a cloud based virtual base station is as follows: ADD cvBTS: cvBTSId, RatType, OperatorId. Of course, the operation is an example, and there may be other forms, which are not described herein.

Figure 13A:
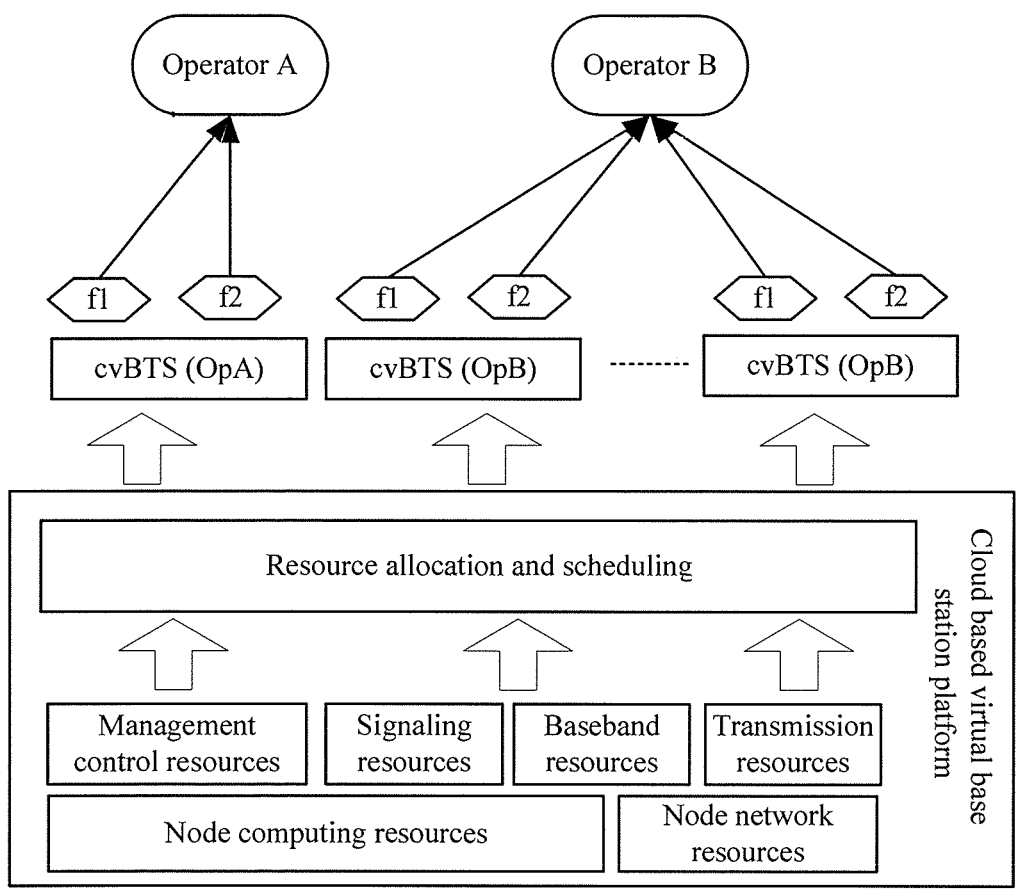
FIG. 13a is a schematic diagram of specific composition of a radio communication system and an operator system according to an embodiment of the present invention.

As shown in FIG. 13a, when multiple cloud based virtual base stations provide base station services to multiple operators, one cloud based virtual base station may provide base station services to only one operator. In this embodiment, operators are operator A (OpA) and operator B (OpB), and each cloud based virtual base station (both cells f1 and f2 in the cvBTS are provided to the same operator). In this embodiment, only two operators are used as examples, and of course, there may be more operators, which are not further described herein. FIG. 13a does not illustrate the cvBTSMgr.

In addition, in this embodiment, the cloud based virtual base station platform is divided into three layers according to functions. The physical layer includes node (Node) computing resources and Node network resources; the resource layer includes management control resources, signaling resources, baseband resources, and transmission resources; the resource scheduling layer allocates and schedules the resources at the resource layer.

The Node computing resources may include general-purpose computing resources and dedicated computing resources, and in this case, the resource layer abstracts resources of the physical layer. During abstraction of resources, dedicated resources need to be considered, for example, some dedicated computing resources are only used to process the baseband algorithm of a universal mobile telecommunications system (Universal Mobile Telecommunications System, UMTS), and other dedicated computing resources are used to process the baseband algorithm of long term evolution (Long Term Evolution, LTE) system.

In this embodiment, the logical resources include management control resources, signaling resources, baseband resources, and transmission resources. For example, general-purpose computing resources are abstracted into management control resources and signaling resources, and network resources are abstracted into transmission resources; finally the resource layer abstracts a series of resource capabilities: UMTS management control resource capabilities, UMTS signaling resource capabilities, UMTS baseband resource capabilities, LTE management control resource capabilities, LTE signaling resource capabilities, LTE baseband resource capabilities, time division synchronous (Time Division Synchronous, TDS) CDMA management control resource capabilities, TDS CDMA signaling resource capabilities, TDSCDM baseband resource capabilities, and transmission resource capabilities.

In this embodiment, functions of the physical layer and resource layer of the cloud based virtual base station platform are provided by the nodes in the system, where the nodes are computers, base transceiver stations, or other devices that have computing capabilities; functions of the resource scheduling layer of the cloud based virtual base station platform are provided by the node management device, where the node management device is deployed on the nodes or deployed on an independent server.

The cloud based virtual base station may request corresponding resources from the resource scheduling layer of the cloud based virtual base station platform according to service requirements of the operator; the cloud based virtual base station platform schedules, according to the request of the cloud based virtual base station through scheduling of the resource scheduling layer, the logical resources provided by the resource layer to the cloud based virtual base station for use. Because the logical resources are actually abstracted from baseband physical resources of the nodes, the baseband physical resources provided by the nodes in the system may be finally scheduled by the above scheduling to the cloud based virtual base station for use.

Meanwhile, when the node providing resources to the cloud based virtual base station is faulty, the cloud based virtual base station platform may allocate, at the resource scheduling layer according to a resource scheduling algorithm, logical resources of other nodes provided by the resource layer, to the cloud based virtual base station.

In this embodiment, a cloud based virtual base station may be controlled to provide services to only one operator at the same time, so that the cloud based virtual base stations providing services to different operators are different, which can reduce coupling between operators; in another aspect, even though a cloud based virtual base station provides services to multiple operators simultaneously, resource scheduling can be performed for the cloud based virtual base station through the cloud based virtual base station platform, which can also reduce the impact due to service change between operators which use the services provided by the same cloud based virtual base station. For example, when physical resources such as a node providing resources to a cloud based virtual base station are faulty, requirements of the cloud based virtual base station can be satisfied timely through scheduling of the cloud based virtual base station platform, so that the services of the cloud based virtual base station can be recovered quickly or that lossless services can be implemented, thereby improving security of the services running on the device; meanwhile, when services of the cloud based virtual base station increase abruptly, the cloud based virtual base station may request the cloud based virtual base station platform to allocate new resources, which increases service processing capabilities of the cloud based virtual base station and improves sharing efficiency of the base station resources.

Figure 13B:
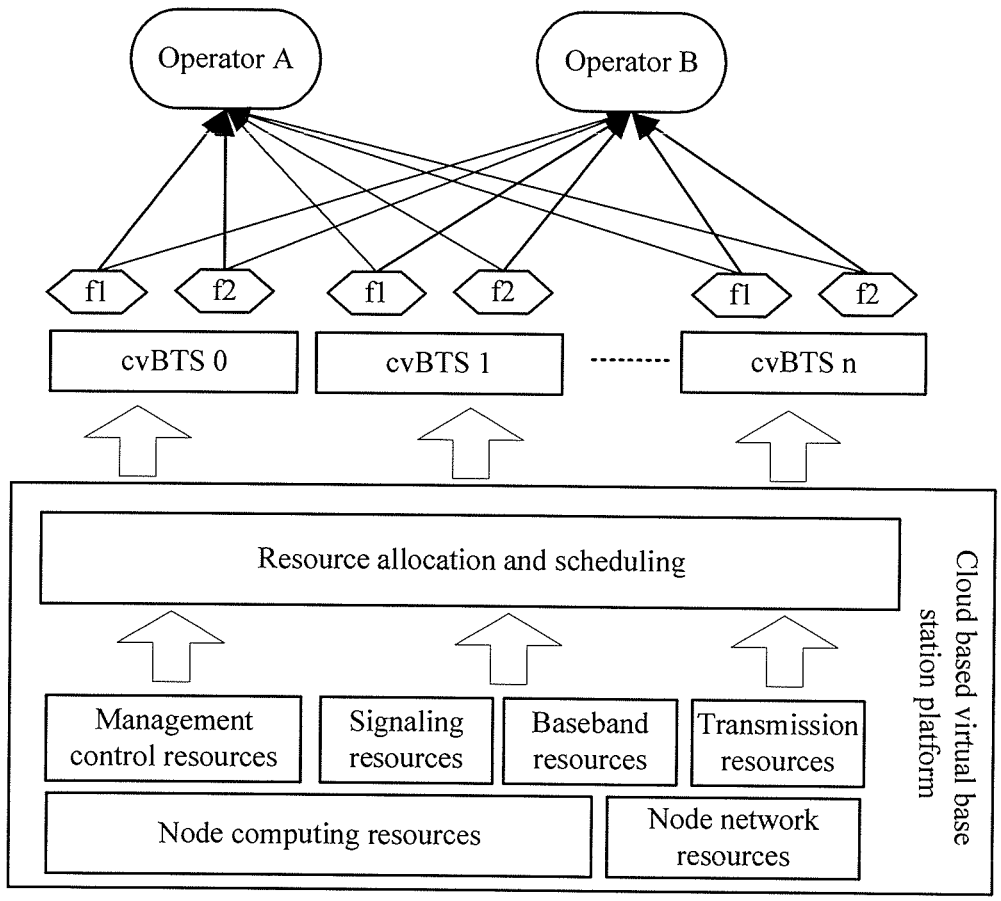
FIG. 13b is another schematic diagram of specific composition of a radio communication system and an operator system according to an embodiment of the present invention.

FIG. 13b shows another specific embodiment of the present invention. In this embodiment, multiple cloud based virtual base stations provide base station services to multiple operators, and one cloud based virtual base station provides base station services to multiple operators. Each cloud based virtual base station may not belong to any specific operator, for example, may belong to a third-party cloud based virtual base station provider. Cells of each cloud based virtual base station may be shared by multiple operators, and each cloud based virtual base station may use resources of any node in the system. Likewise, in this embodiment, only two operators are used as examples, and of course, there may be more operators, which are not further described herein.

Likewise, in this embodiment, the cloud based virtual base station platform is divided into three layers according to functions. The physical layer includes Node computing resources and Node network resources; the resource layer includes management control resources, signaling resources, baseband resources, and transmission resources; the resource scheduling layer allocates and schedules the resources in the resource layer. The Node computing resources may include general-purpose computing resources and dedicated computing resources, and in this case, the resource layer abstracts resources of the physical layer. During abstraction of resources, dedicated resources need to be considered, for example, some dedicated computing resources are used to process only the baseband algorithm of a UMTS, and other dedicated computing resources are used to process the baseband algorithm of LTE.

In this embodiment, general-purpose computing resources are abstracted into management control resources and signaling resources, and network resources are abstracted into transmission resources; finally the resource layer abstracts a series of resource capabilities. Details are consistent with the example in FIG. 13 and are not repeated herein.

Likewise, in this embodiment, when physical resources such as a node providing resources to a cloud based virtual base station are faulty, requirements of the cloud based virtual base station can be satisfied timely through scheduling of the cloud based virtual base station platform, so that the services of the cloud based virtual base station can be recovered quickly or that lossless services can be implemented, thereby improving security of the services running on the device; meanwhile, when services of an operator on a cloud based virtual base station keep increasing, the cloud based virtual base station may apply for more resources from the cloud based virtual base station platform according to service load conditions. Therefore, the following case is avoided: Services of another operator are squeezed because services of an operator keep increasing (relatively, in the conventional solution, when multiple operators share resources of a base station, because resources of a base station are relatively limited, operators may mutually squeeze services). Coupling of base station resources between operators is also reduced to some degree.

Figure 14A:
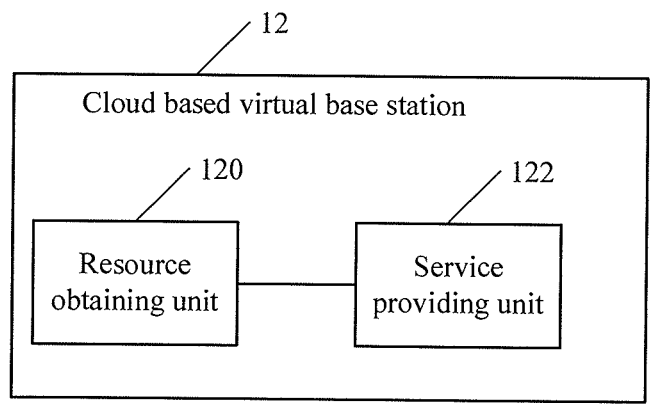
FIG. 14a is a schematic diagram of specific composition of a cloud based virtual base station according to an embodiment of the present invention.

FIG. 14a is a schematic diagram of composition of a cloud based virtual base station according to an embodiment of the present invention. The cloud based virtual base station 12 includes: a resource obtaining unit 120, configured to request corresponding logical resources from a resource scheduling layer of a cloud based virtual base station platform according to service requirements, so that the cloud based virtual base station platform schedules the logical resources to the cloud based virtual base station for use according to the request of the cloud based virtual base station through scheduling of the resource scheduling layer, where the logical resources are logical resources of a resource layer scheduled at the resource scheduling layer into which the cloud based virtual base station platform virtualizes base station physical resources of nodes at a physical layer, and a service providing unit 122, configured to provide base station services to one or more operators based on the logical resources scheduled by the cloud based virtual base station platform.

The service providing unit 122 may provide base station services to only one operator or provide base station services to multiple operators based on the logical resources scheduled by the cloud based virtual base station platform. Reference may be made to examples in FIG. 13a and FIG. 13b.

When a node or service changes in the system, the resource obtaining unit 120 may further request the cloud based virtual base station platform to perform resource scheduling according to the change. For details, reference may be made to the description in the subsequent resource scheduling method and method for managing a base station.

Figure 14B:
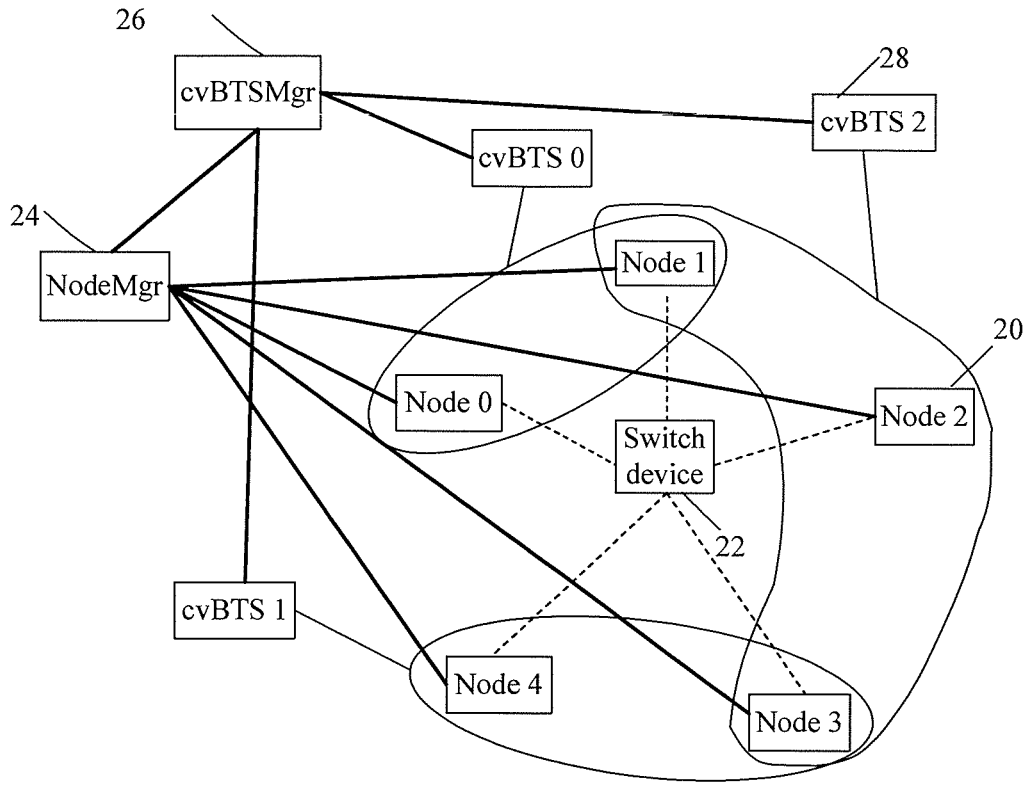
FIG. 14b is a schematic architecture diagram of a network topology of a virtual base station system according to an embodiment of the present invention.

FIG. 14b is a schematic diagram of a network topology of a virtual base station system according to an embodiment of the present invention. The system includes the following five parts.

One or more nodes (Node) 20 are 5 nodes in FIG. 14b: node 0, node 1, node 2, node 3, and node 4, which are configured to provide computing resources and network resources of the base station, and virtualize the computing resources and network resources into logical resources.

The logical resources include management control resources, signaling resources, baseband resources, and transmission resources. Therefore, the computing resources and network resources can be correspondingly virtualized into management control resources, signaling resources, baseband resources, and transmission resources. Of course, categories of logical resources may also be added or changed according to requirements of specific services, which is not further described herein. The Node may be homogeneous or heterogeneous, for example, a PC may be a Node, and a base transceiver station (Base Transceiver Station, BTS) may be a Node; the Node in the embodiment of the present invention may be any device that has computing capabilities, that is, any one of the above 5 nodes is a computer, a base transceiver station, or other devices that have computing capabilities.

A switch device 22 is configured to perform data exchange between the nodes. In the embodiment of the present invention, the switch device (Switch) may be any device capable of data exchange; there may be multiple Switches in the system, and multiple Switches may be networked to form a complex topology.

A node management device (NodeMgr) 24 is configured to obtain capabilities of logical resources of the nodes managed by the node management device, form a resource pool according to the capabilities of the logical resources by using the logical resources of the nodes managed by the node management device, and based on data exchange of the switch device, schedule the corresponding logical resources in the resource pool to the cloud based virtual base station for use.

The node management device may be deployed on any one of the multiple nodes, or separately deployed on an independent server. If the node management device is deployed on a node, information exchange between the node management device and each node may be implemented through the above switch device; if the node management device is deployed on an independent server, the node management device may also be connected to the switch device, and information exchange between the node management device and each node may be implemented through the above switch device. Of course, the node management device may also be connected to a part or all of the nodes to implement direct or indirect information exchange.

A cloud based virtual base station management device (cvBTSMgr) 26 is configured to manage and control resources of the cloud based virtual base station (Cloud based virtual BTS, cvBTS) according to the information of the resource pool provided by the node management device.

The cloud based virtual base station management device may be deployed on any one of the multiple nodes, or deployed with the node management device together, or separately deployed on an independent server.

Similarly, if the cloud based virtual base station management device is deployed on a node, information exchange between the cloud based virtual base station management device and each node may be implemented through the above switch device; if the cloud based virtual base station management device is deployed on an independent server, the cloud based virtual base station management device may also be connected to the switch device, and information exchange between the cloud based virtual base station management device and each node may be implemented through the above switch device. Of course, the cloud based virtual base station management device may also be connected to a part or all of the nodes to implement direct or indirect information exchange.

One or more cloud based virtual base stations (cvBTS) 28 are configured to obtain the logical resources according to the management of the cloud based virtual base station management device and the scheduling of the node management device, and provide base station services based on the logical resources. FIG. 14*b* shows 3 cvBTSs, which are respectively cvBTS 0, cvBTS 1, and cvBTS 2. Resources of each cvBTS are provided by nodes in a circle associated with the cvBTS, for example, in this embodiment, resources of cvBTS 0 are provided by node 0 and node 1. cvBTS 0 is managed by cvBTSMgr 4, and node 0 and node 1 are managed by NodeMgr 3, and other explanations are similar.

Of course, the number of devices in this embodiment is not limited by that shown in FIG. 14*b*. There may be multiple possibilities, which are not further described herein.

The cloud based virtual base station may be deployed across the Nodes. Logical resources of one cloud based virtual base station may come from one or more Nodes; logical resources of one Node may also be allocated to one or more cloud based virtual base stations for use. Generally, the cloud based virtual base station is deployed on a node, and a resource management module of the cloud based virtual base station may be deployed on the node which provides management control resources, while logical resources of the cloud based virtual base station may come from each node, where the resource management module of the cloud based virtual base station is configured to manage and control the logical resources of the cloud based virtual base station.

As shown in FIG. 14*b*, the cloud based virtual base station cvBTS 0 uses resources of Node 0 and Node 1, cvBTS 1 uses resources of Node 3 and Node 4, and cvBTS 2 uses resources of Node 1, Node 2, and Node 3.

Figure 15:
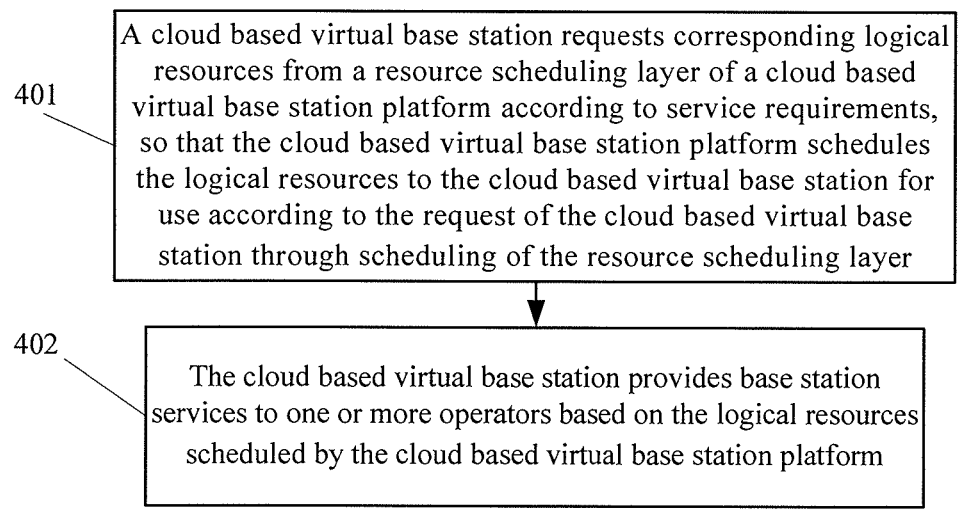
FIG. 15 is a specific schematic flowchart of a resource scheduling method according to an embodiment of the present invention.

Corresponding to the above system embodiments, an embodiment of the present invention further provides a resource scheduling method, used in the above system. As shown in FIG. 15, the method includes the following:

401. A cloud based virtual base station requests corresponding logical resources from a resource scheduling layer of a cloud based virtual base station platform according to service requirements, so that the cloud based virtual base station platform schedules the logical resources to the cloud based virtual base station for use according to the request of the cloud based virtual base station through scheduling of the resource scheduling layer, where the logical resources are logical resources of a resource layer scheduled at the resource scheduling layer into which the cloud based virtual base station platform virtualizes base station physical resources of nodes at a physical layer.

402. The cloud based virtual base station provides base station services to one or more operators based on the logical resources scheduled by the cloud based virtual base station platform.

The base station physical resources are provided by the nodes in the system. The method may further include: when the node providing resources to the cloud based virtual base station is faulty, virtualizing, by the cloud based virtual base station platform, at the resource scheduling layer according to a resource scheduling algorithm, base station physical resources provided by other nodes in the system into logical resources, and allocating the logical resources to the cloud based virtual base station.

When the node providing resources to the cloud based virtual base station is faulty, the cloud based virtual base station platform is further configured to allocate, at the resource scheduling layer according to a resource scheduling algorithm, logical resources of other nodes provided by the resource layer, to the cloud based virtual base station.

FIG. 16-FIG. 21 describe various cases in the method for managing a base station in the embodiments of the present invention.

Figure 16:
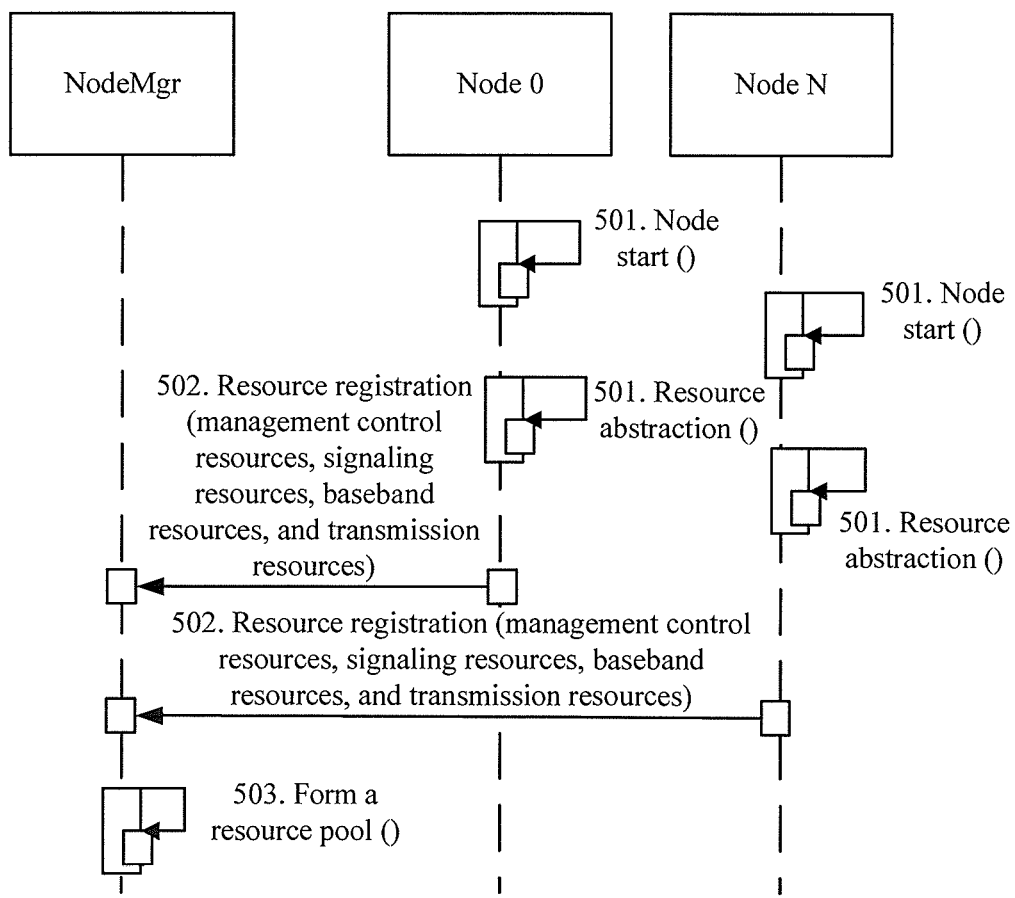
FIG. 16 is a schematic diagram of a resource abstraction and registration process in a method for managing a base station according to an embodiment of the present invention.

FIG. 16 shows a resource abstraction and registration process in a method for managing a base station according to an embodiment of the present invention. In this embodiment, two nodes are used as examples for description.

501. Nodes, after being started, "abstract" (or referred to as "virtualize") their computing resources and network resources into logical resources.

502. The nodes register capabilities of the logical resources with a node management device.

503. The node management device forms a resource pool by using the registered capabilities of the logical resources, and records address information nodes of which providing resources in the resource pool.

Figure 17:
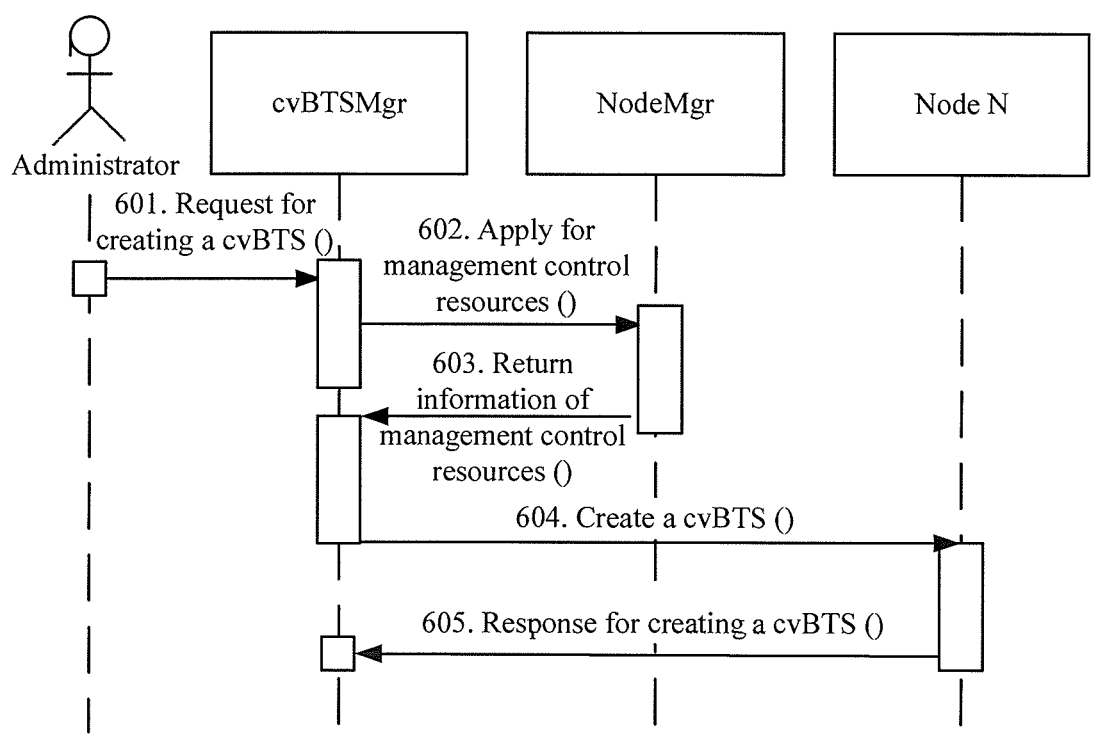
FIG. 17 is a schematic diagram of a process of creating a cloud based virtual base station in a method for managing a base station according to an embodiment of the present invention.

FIG. 17 shows a process of creating a cloud based virtual base station in a method for managing a base station according to an embodiment of the present invention.

601. A cloud based virtual base station management device receives a request for creating a cloud based virtual base station.

602. The cloud based virtual base station management device applies for management control resources from the node management device.

603. The node management device returns management control resource information to the cloud based virtual base station management device.

604. The cloud based virtual base station management device requests, after the application is successful, the node where the management control resources are located to create a cloud based virtual base station.

605. The node where the management control resources are located creates a cloud based virtual base station according to the request for creating a cloud based virtual base station, and returns a response.

Figure 18:
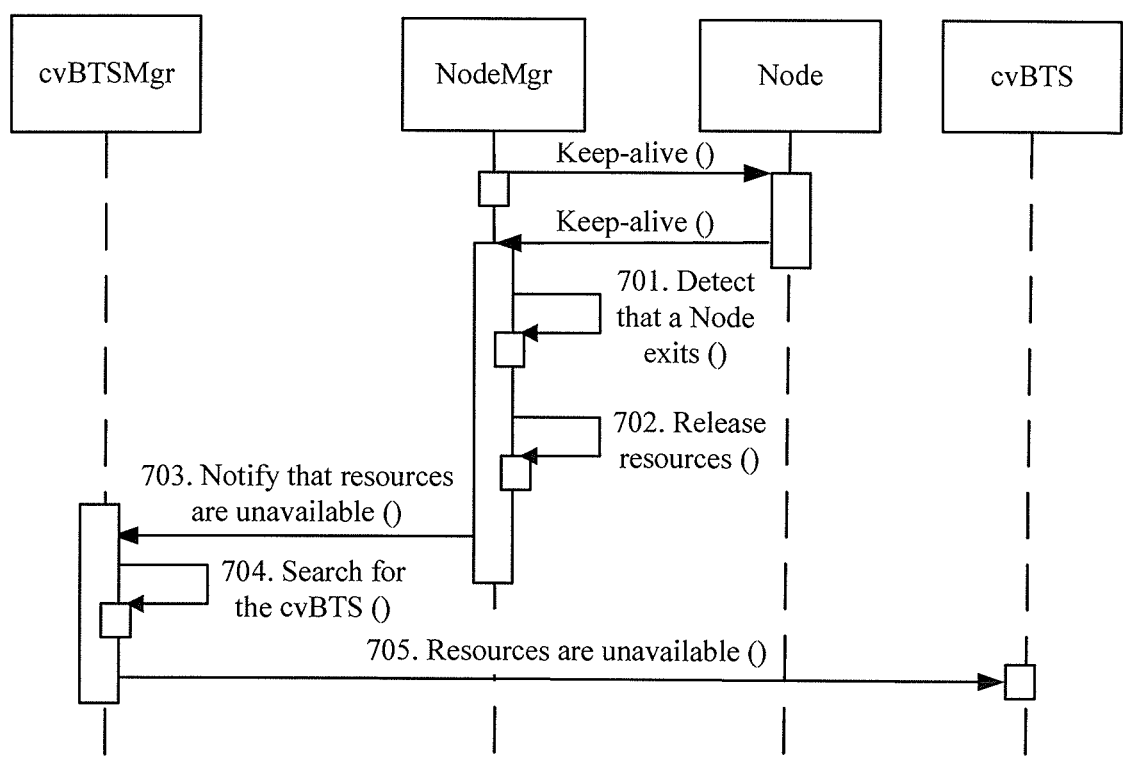
FIG. 18 is a schematic diagram of a process of deleting a node in a method for managing a base station according to an embodiment of the present invention.

FIG. 18 shows a process of deleting a node in a method for managing a base station according to an embodiment of the present invention.

701. A node management device detects that a node exits.

702. The node management device releases the resources provided by the node that exits in the resource pool.

703. Notify a cloud based virtual base station management device that the resources provide by the node that exits are unavailable.

704. The cloud based virtual base station management device searches, according to the notification, for the cloud based virtual base station which uses the resources provided by the node that exits.

705. The cloud based virtual base station management device notifies the cloud based virtual base station that the resources provide by the node that exits are unavailable.

Figure 19:
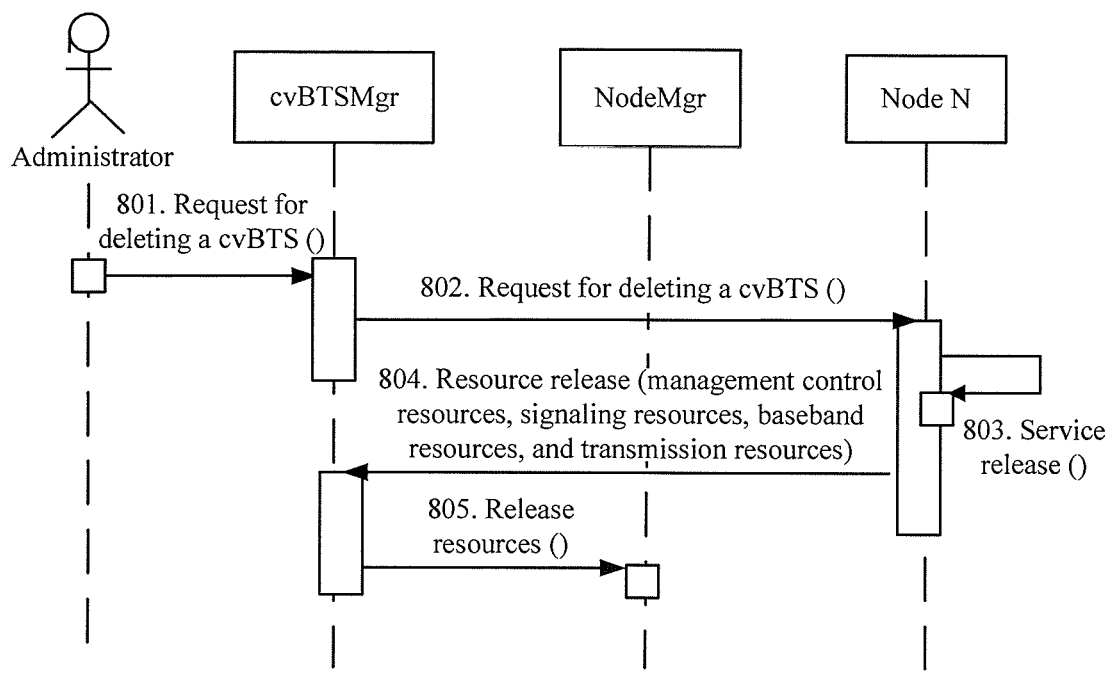
FIG. 19 is a schematic diagram of a process of deleting a cloud based virtual base station in a method for managing a base station according to an embodiment of the present invention.

FIG. 19 shows a process of deleting a cloud based virtual base station in a method for managing a base station according to an embodiment of the present invention.

801. A cloud based virtual base station management device receives a request for deleting a cloud based virtual base station.

802. The cloud based virtual base station management device notifies the node which creates the cloud based virtual base station of deleting the cloud based virtual base station.

803. The node which creates the cloud based virtual base station locally releases service resources of the cloud based virtual base station.

804. The node notifies the cloud based virtual base station management device of releasing the logical resources of the cloud based virtual base station.

805. The cloud based virtual base station management device notifies the node management device of releasing the logical resources of the cloud based virtual base station in the resource pool.

Figure 20:
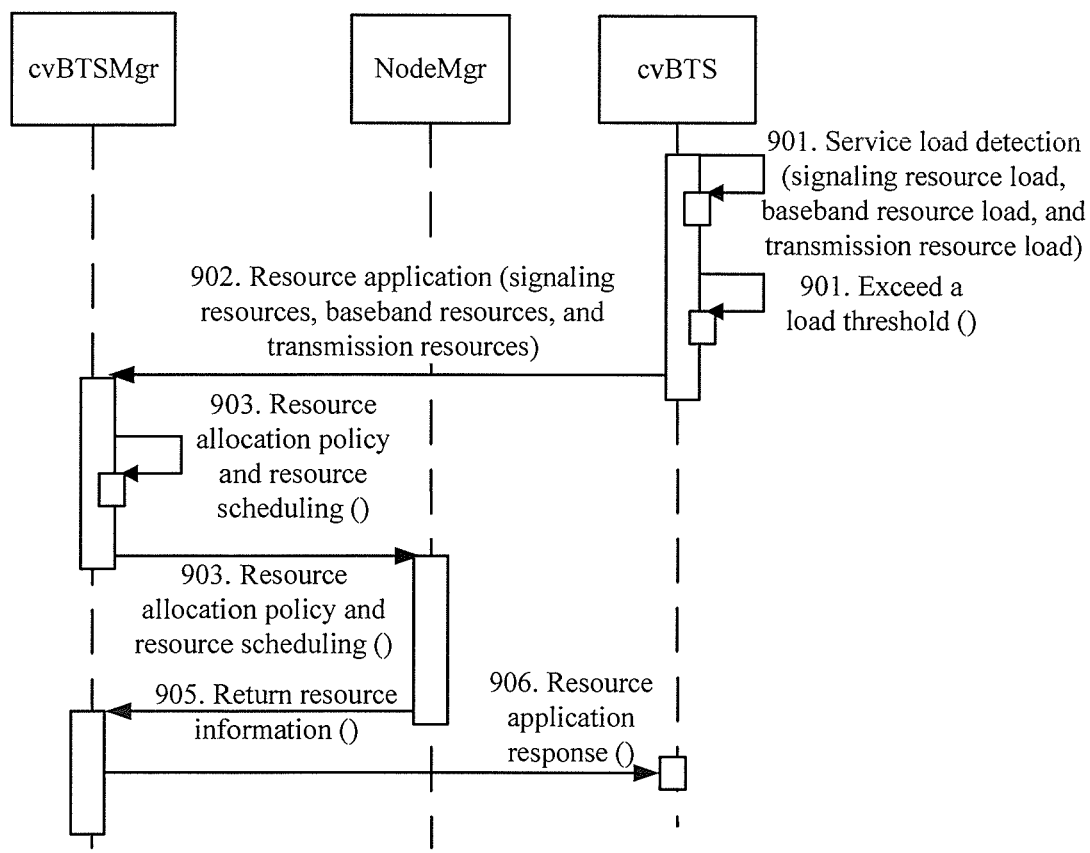
FIG. 20 is a schematic diagram of a process of applying for new resources by a cloud based virtual base station in a method for managing a base station according to an embodiment of the present invention.

FIG. 20 shows a process of applying for new resources by a cloud based virtual base station in a method for managing a base station according to an embodiment of the present invention.

901. A cloud based virtual base station detects a service is overloaded, for example, it detects that a service exceeds a load threshold.

902. The cloud based virtual base station applies for resources from the cloud based virtual base station management device.

903. The cloud based virtual base station management device generates a resource application request according to a locally stored resource scheduling policy.

904. The cloud based virtual base station management device applies for logical resources from the node management device.

905. Receive information of the applied logical resources which is returned by the node management device.

906. The cloud based virtual base station management device returns a resource application response to the cloud based virtual base station.

Figure 21:
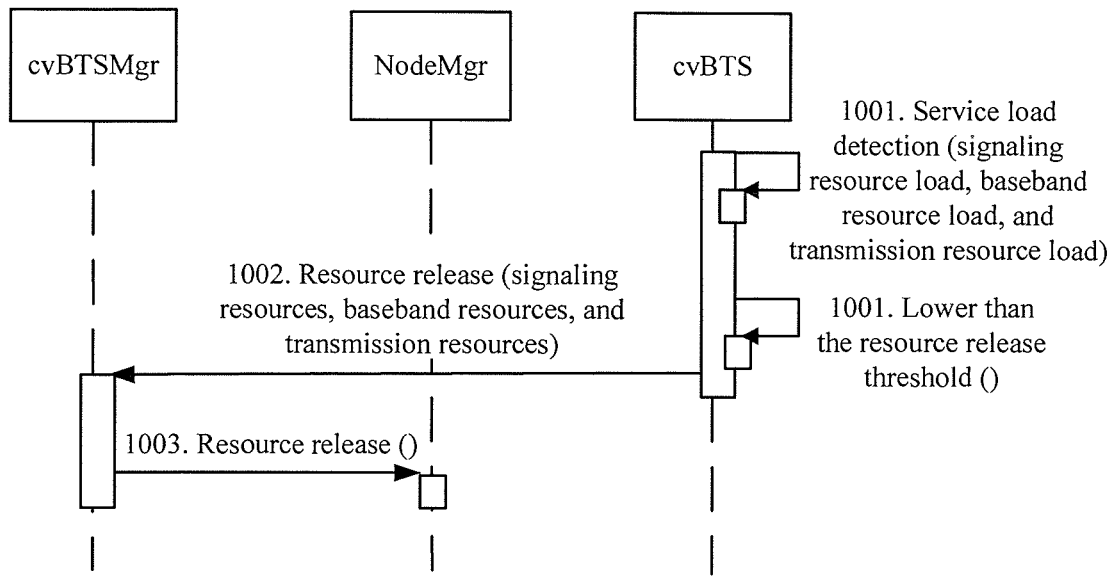
FIG. 21 is a schematic diagram of a process of releasing resources by a cloud based virtual base station in a method for managing a base station according to an embodiment of the present invention.

FIG. 21 shows a process of releasing resources by a cloud based virtual base station in a method for managing a base station according to an embodiment of the present invention.

1001. A cloud based virtual base station detects that a service is lower than a load threshold.

1002. The cloud based virtual base station sends a resource release application to the cloud based virtual base station management device.

1003. The cloud based virtual base station management device notifies, according to the resource release application, the node management device of releasing corresponding logical resources.

To conclude, it is understandable that in the embodiments of the present invention, multiple operators can share computing capabilities between mass base station physical resources provided by multiple nodes. Therefore, the overall computing capabilities of the system can be dynamically and flexibly extended according to traffic, which can well adapt to the scenario of a temporary heavy traffic impact, and service decoupling between operators can be implemented better.

In still another aspect:

An embodiment of the present invention provides a multi-standard base station implementation solution based on a cloud based virtual base station platform and a cloud based virtual base station (Cloud based virtual BTS, cvBTS), so that the multi-standard base station can share computing capabilities between mass base station physical resources (such as Nodes). Therefore, the overall computing capabilities of the system can be dynamically and flexibly extended according to traffic, which can well adapt to the scenario of a temporary heavy traffic impact.

Based on the embodiment provided in this aspect, multiple operators can also share computing capabilities between mass base station physical resources (such as nodes). The overall computing capabilities of the system can be dynamically and flexibly extended according to traffic of each cloud based virtual base station, which can well adapt to the scenario of a temporary heavy traffic impact. On the contrary, the embodiments provided in the previous aspect may also completely or partially implement functions of the embodiments provided in this aspect, namely, the multi-standard base station implementation solution based on a cloud based virtual base station platform and a cloud based virtual base station (Cloud based virtual BTS, cvBTS), so that the multi-standard base station can share computing capabilities between mass base station physical resources (such as Nodes). Therefore, the overall computing capabilities of the system can be dynamically and flexibly extended according to traffic, which can well adapt to the scenario of a temporary heavy traffic impact.

In the embodiments provided in this aspect, multiple operators can also share computing capabilities between mass base station physical resources (such as nodes) as described in the previous aspect. Therefore, if the drawings in the embodiments are similar to a part or all of the drawings in the embodiments provided in the previous aspect, it may also be understandable that the drawings or the apparatus parts or method steps in the drawings can execute the same functions.

Figure 22A:
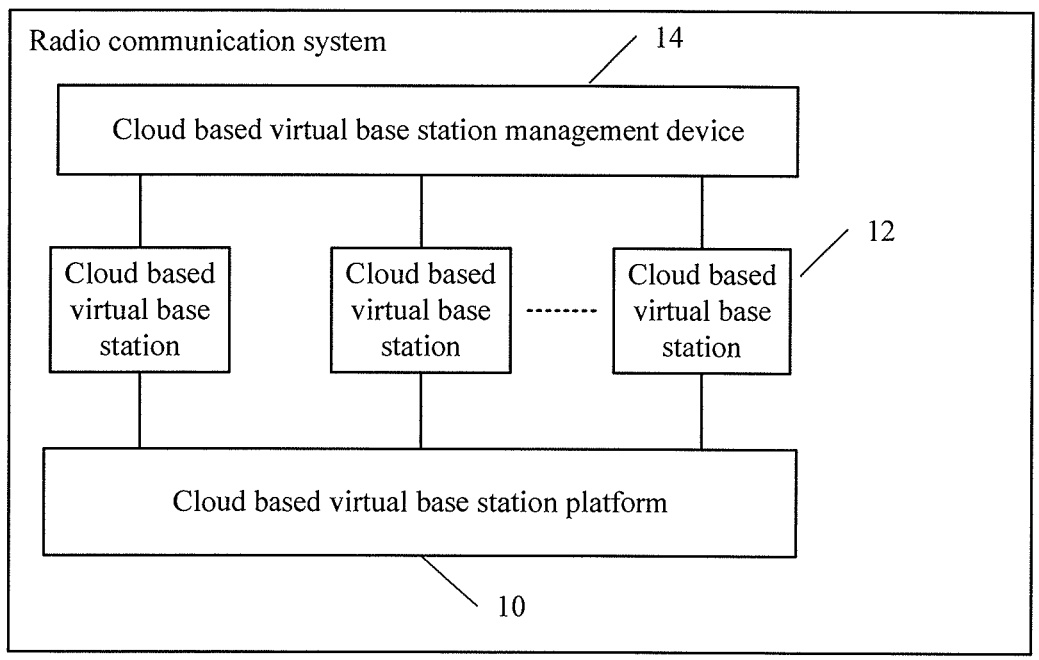
FIG. 22a is a schematic diagram of specific composition of a radio communication system according to an embodiment of the present invention.

FIG. 22a shows a schematic diagram of specific composition of a radio communication system according to an embodiment of the present invention. The system 1 includes: a cloud based virtual base station platform 10, configured to virtualize base station physical resources of nodes at a physical layer into logical resources of a resource layer, and schedule, at a resource scheduling layer, the logical resources provided by the resource layer to a cloud based virtual base station, where the base station physical resources include node computing resources and node network resources, and the cloud based virtual base station is a cloud based virtual base station having different standards, and the logical resources include management control resources, signaling resources, baseband resources, and transmission resources; a cloud based virtual base station 12, configured to provide base station services of predetermined standards based on the logical resources scheduled by the cloud based virtual base station platform 10; and a cloud based virtual base station management device 14, configured to manage the cloud based virtual base station.

It should be noted that the connections between devices are only examples, and that devices in the system may have more contacts when needed, for example, the cloud based virtual base station management device and the cloud based virtual base station platform may also have a direct contact.

Meanwhile, the number of cloud based virtual base stations in a system may be determined according to service requirements and resource restrictions, and multiple cloud based virtual base stations may exist in a same standard.

To distinguish cloud based virtual base stations having different standards, the cloud based virtual base station may include a cloud based virtual base station identifier attribute and a cloud based virtual base station standard identifier attribute, where the cloud based virtual base station identifier attribute is used to identify different cloud based virtual base stations, and the cloud based virtual base station standard identifier attribute is used to identify the standard of the cloud based virtual base station; thereby, other devices in the system and network can distinguish different cloud based virtual base stations and standards thereof. For example, the cloud based virtual base station may include: attribute 1: cloud based virtual base station instance identifier: cvBTSId; and attribute 2: cloud based virtual base station standard identifier: RatType. A schematic typical operation of adding a cloud based virtual base station is as follows: ADD cvBTS: cvBTSId, RatType. Of course, the operation is an example, and there may be other forms, which are not described herein.

The cloud based virtual base station having different standards includes one or more of the following: a UMTS-standard cloud based virtual base station, an LTE-standard cloud based virtual base station, and a time division synchronous (Time Division Synchronous, TDS) CDMA-standard cloud based virtual base station.

Figure 22B:
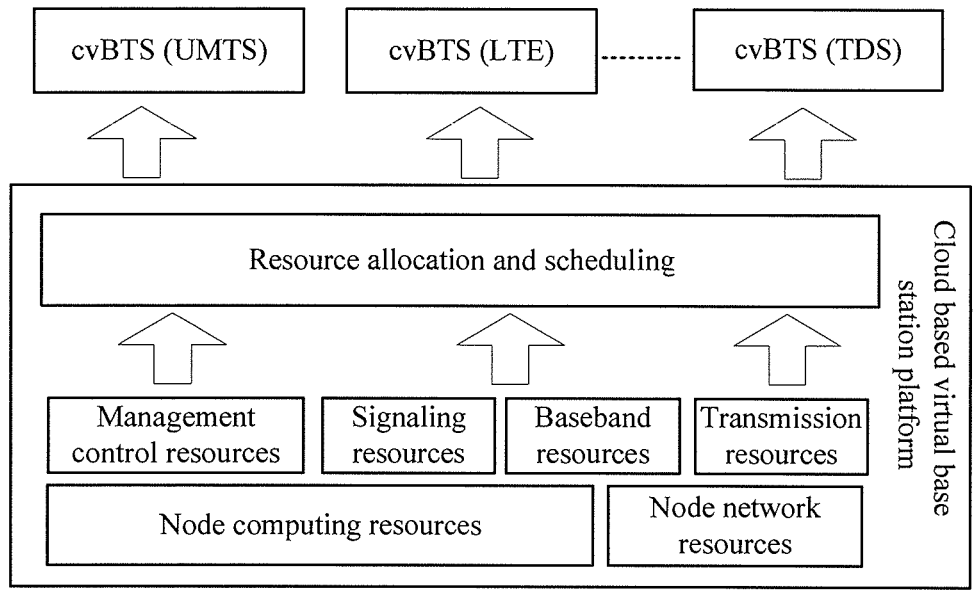
FIG. 22b is a schematic hierarchical structural diagram of a cloud based virtual base station platform according to an embodiment of the present invention.

As shown in FIG. 22b, the cloud based virtual base station platform is divided into three layers according to functions. The physical layer includes Node computing resources and Node network resources; the resource layer includes management control resources, signaling resources, baseband resources, and transmission resources; the resource scheduling layer allocates and schedules the resources in the resource layer.

The Node computing resources may include general-purpose computing resources and dedicated computing resources, and in this case, the resource layer virtualizes resources of the physical layer into logical resources. During virtualization of resources, dedicated resources need to be considered, for example, some dedicated computing resources are only used to process the baseband algorithm of a UMTS, and other dedicated computing resources are used to process the baseband algorithm of LTE.

The computing resources and network resources are virtualized into logical resources. To be specific, the resource layer abstracts a series of resource capabilities: UMTS management control resource capabilities, UMTS signaling resource capabilities, UMTS baseband resource capabilities, LTE management control resource capabilities, LTE signaling resource capabilities, LTE baseband resource capabilities, TDS CDMA management control resource capabilities, TDS signaling resource capabilities, TDS baseband resource capabilities, and transmission resource capabilities.

In this embodiment, base station physical resources are provided by the nodes in the system. The cloud based virtual base station may request corresponding resources from the resource scheduling layer of the cloud based virtual base station platform according to service requirements of the cloud based virtual base station; the cloud based virtual base station platform schedules, according to the request of the cloud based virtual base station through scheduling of the resource scheduling layer, the logical resources provided by the resource layer to the cloud based virtual base station for use.

When a node providing resources to the cloud based virtual base station is faulty, the cloud based virtual base station platform is further configured to virtualize, at the resource scheduling layer according to a resource scheduling algorithm, base station physical resources provided by other nodes in the system into logical resources, and allocate the logical resources to the cloud based virtual base station.

In this embodiment, base station physical resources are integrated through the cloud based virtual base station platform and are provided to a cloud based virtual base station having different standards; when the base station physical resources are faulty or resource requirements of the cloud based virtual base station increase, allocation of resources can be effectively implemented through the cloud based virtual base station platform, and security and effectiveness of resource sharing can be improved.

For example, when physical resources such as a node providing resources to a cloud based virtual base station are faulty, requirements of the cloud based virtual base station can be satisfied timely through scheduling of the cloud based virtual base station platform, so that the services of the cloud based virtual base station can be recovered quickly or that lossless services can be implemented, thereby improving security of the services running in the system; meanwhile, when services of the cloud based virtual base station increase abruptly, the cloud based virtual base station may request the cloud based virtual base station platform to allocate new resources, which increases service processing capabilities of the cloud based virtual base station and improves sharing efficiency of the base station resources.

Figure 23:
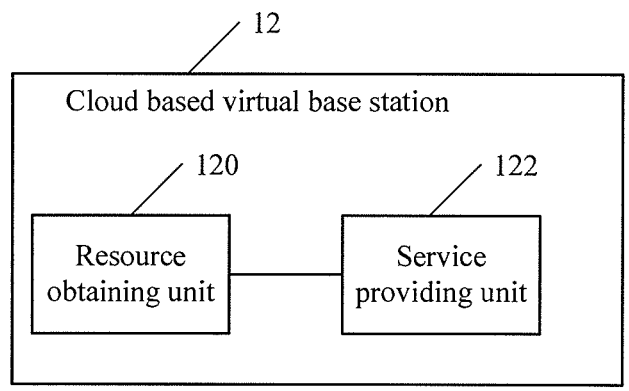
FIG. 23 is a schematic diagram of composition of a cloud based virtual base station according to an embodiment of the present invention.

FIG. 23 shows a schematic diagram of composition of a cloud based virtual base station according to an embodiment of the present invention. The cloud based virtual base station in this embodiment is a cloud based virtual base station having a predetermined standard. The cloud based virtual base station includes: a resource obtaining unit 120, configured to request corresponding logical resources from a resource scheduling layer of a cloud based virtual base station platform according to service requirements, so that the cloud based virtual base station platform schedules the logical resources to the cloud based virtual base station for use according to the request of the cloud based virtual base station through scheduling of the resource scheduling layer, where the logical resources are logical resources of a resource layer scheduled at the resource scheduling layer into which the cloud based virtual base station platform virtualizes base station physical resources of nodes at a physical layer, and a service providing unit 122, configured to provide base station services of the predetermined standard based on the logical resources scheduled by the cloud based virtual base station platform.

Figure 24:
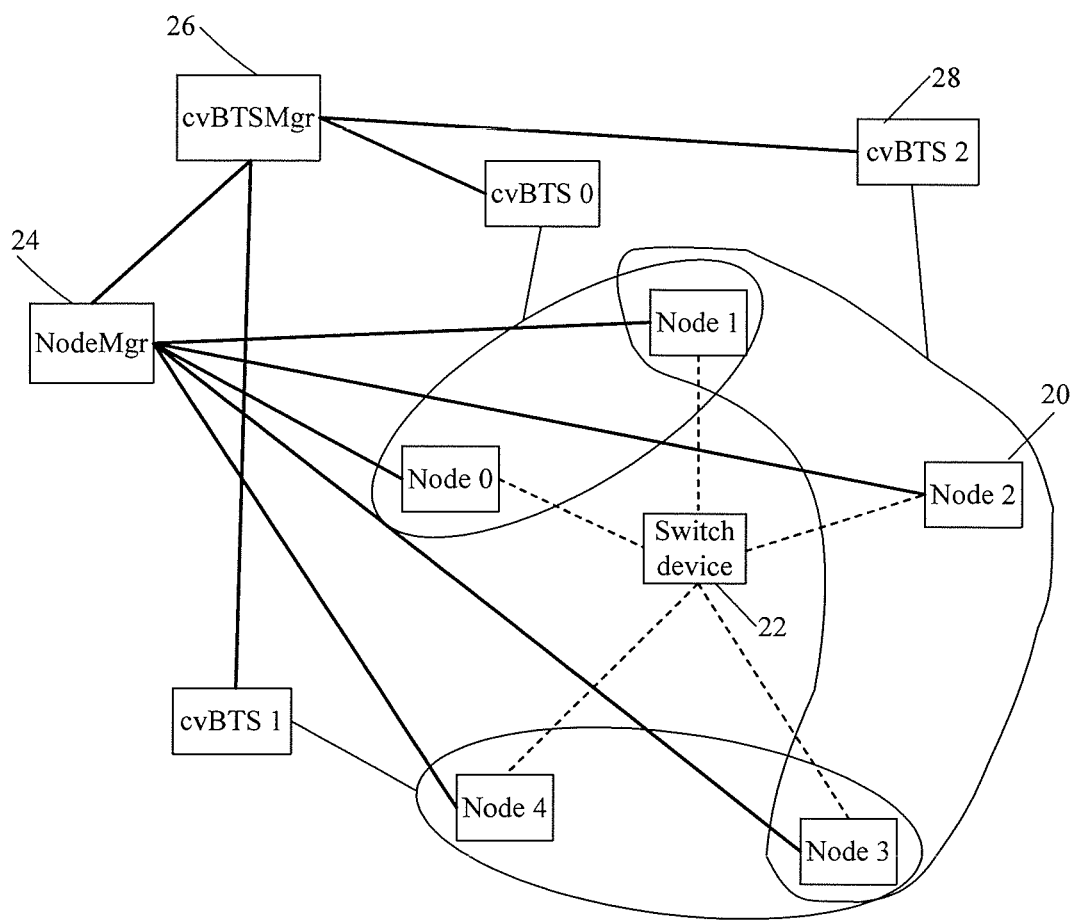
FIG. 24 is a schematic architecture diagram of a network topology of a virtual base station system according to an embodiment of the present invention.

FIG. 24 is a schematic diagram of a network topology of a virtual base station system according to an embodiment of the present invention. The system includes the following five parts.

One or more nodes (Node) 20 are 5 nodes in FIG. 24: node 0, node 1, node 3, node 3, and node 4, which are configured to provide computing resources and network resources of the base station, and virtualize the computing resources and network resources into logical resources.

The logical resources include management control resources, signaling resources, baseband resources, and transmission resources. Therefore, the computing resources and network resources can be correspondingly virtualized into management control resources, signaling resources, baseband resources, and transmission resources. Of course, categories of logical resources may also be added or changed according to requirements of specific services, which is not further described herein. The Node may be homogeneous or heterogeneous, for example, a PC may be a Node, and a base transceiver station (Base Transceiver Station, BTS) may be a Node; the Node in the embodiment of the present invention may be any device that has computing capabilities, that is, any one of the above 5 nodes is a computer, a base transceiver station, or other devices that have computing capabilities.

A switch device 22 is configured to perform data exchange between the nodes. In the embodiment of the present invention, the switch device (Switch) may be any device capable of data exchange; there may be multiple Switches in the system, and multiple Switches may be networked to form a complex topology.

A node management device (NodeMgr) 24 is configured to obtain capabilities of logical resources of the nodes managed by the node management device, form a resource pool according to the capabilities of the logical resources by using the logical resources of the nodes managed by the node management device, and based on data exchange of the switch device, schedule the corresponding logical resources in the resource pool to the cloud based virtual base station for use.

The node management device may be deployed on any one of the multiple nodes, or separately deployed on an independent server. If the node management device is deployed on a node, information exchange between the node management device and each node may be implemented through the above switch device; if the node management device is deployed on an independent server, the node management device may also be connected to the switch device, and information exchange between the node management device and each node may be implemented through the above switch device. Of course, the node management device may also be connected to a part or all of the nodes to implement direct or indirect information exchange.

A cloud based virtual base station management device (cvBTSMgr) 26 is configured to manage and control resources of the cloud based virtual base station (Cloud based virtual BTS, cvBTS) according to the information of the resource pool provided by the node management device.

The cloud based virtual base station management device may be deployed on any one of the multiple nodes, or deployed with the node management device together, or separately deployed on an independent server.

Similarly, if the cloud based virtual base station management device is deployed on a node, information exchange between the cloud based virtual base station management device and each node may be implemented through the above switch device; if the cloud based virtual base station management device is deployed on an independent server, the cloud based virtual base station management device may also be connected to the switch device, and information exchange between the cloud based virtual base station management device and each node may be implemented through the above switch device. Of course, the cloud based virtual base station management device may also be connected to a part or all of the nodes to implement direct or indirect information exchange.

One or more cloud based virtual base stations (cvBTS) 28 are configured to obtain the logical resources according to the management of the cloud based virtual base station management device and the scheduling of the node management device, and provide base station services based on the logical resources. FIG. 24 shows 3 cvBTSs, which are respectively cvBTS 0, cvBTS 1, and cvBTS 2. Resources of each cvBTS are provided by nodes in a circle associated with the cvBTS, for example, in this embodiment, resources of cvBTS 0 are provided by node 0 and node 1. cvBTS 0 is managed by cvBTSMgr 4, and node 0 and node 1 are managed by NodeMgr 3, and other explanations are similar.

Of course, the number of devices in this embodiment is not limited by that shown in FIG. 24. There may be multiple possibilities, which are not further described herein.

The cloud based virtual base station may be deployed across the Nodes. Logical resources of one cloud based virtual base station may come from one or more Nodes; logical resources of one Node may also be allocated to one or more cloud based virtual base stations for use. Generally, the cloud based virtual base station is deployed on a node, and a resource management module of the cloud based virtual base station may be deployed on the node which provides management control resources, while logical resources of the cloud based virtual base station may come from each node, where the resource management module of the cloud based virtual base station is configured to manage and control the logical resources of the cloud based virtual base station.

As shown in FIG. 24, the cloud based virtual base station cvBTS 0 uses resources of Node 0 and Node 1, cvBTS 1 uses resources of Node 3 and Node 4, and cvBTS 2 uses resources of Node 1, Node 2, and Node 3.

Figure 25:
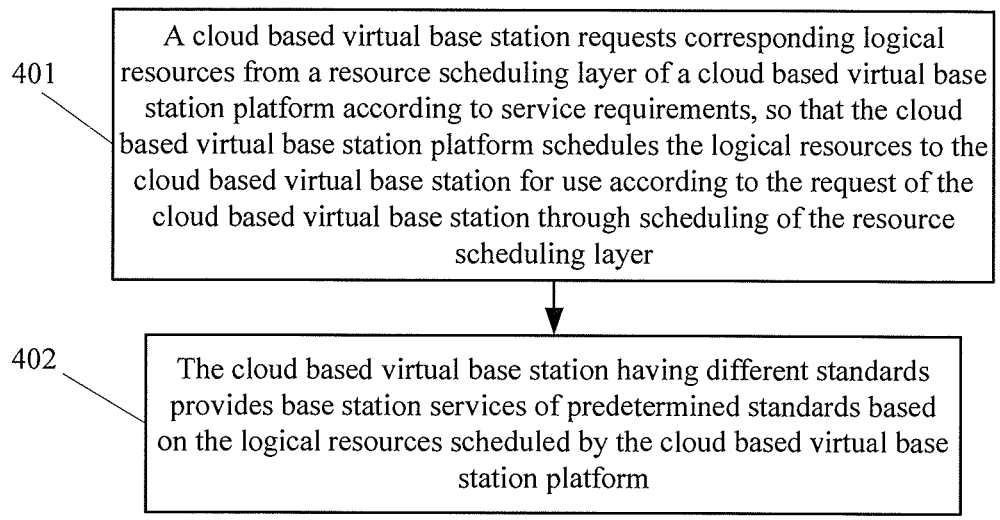
FIG. 25 is a specific schematic flowchart of a resource scheduling method according to an embodiment of the present invention.

Corresponding to the above system embodiments, an embodiment of the present invention further provides a resource scheduling method, used in the above system. As shown in FIG. 25, the method includes the following:

401. A cloud based virtual base station requests corresponding logical resources from a resource scheduling layer of a cloud based virtual base station platform according to service requirements, so that the cloud based virtual base station platform schedules the logical resources to the cloud based virtual base station for use according to the request of the cloud based virtual base station through scheduling of the resource scheduling layer, where the cloud based virtual base station is a cloud based virtual base station having different standards, and the logical resources are logical resources of a resource layer scheduled at the resource scheduling layer into which the cloud based virtual base station platform virtualizes base station physical resources of nodes at a physical layer.

402. The cloud based virtual base station having different standards provides base station services of predetermined standards based on the logical resources scheduled by the cloud based virtual base station platform.

The base station physical resources are provided by the nodes in the system. The method further includes: when the node providing resources to the cloud based virtual base station is faulty, virtualizing, by the cloud based virtual base station platform, at the resource scheduling layer according to a resource scheduling algorithm, base station physical resources provided by other nodes in the system into logical resources, and allocating the logical resources to the cloud based virtual base station.

FIG. 26-FIG. 31 describe various cases in the method for managing a base station in the embodiments of the present invention.

Figure 26:
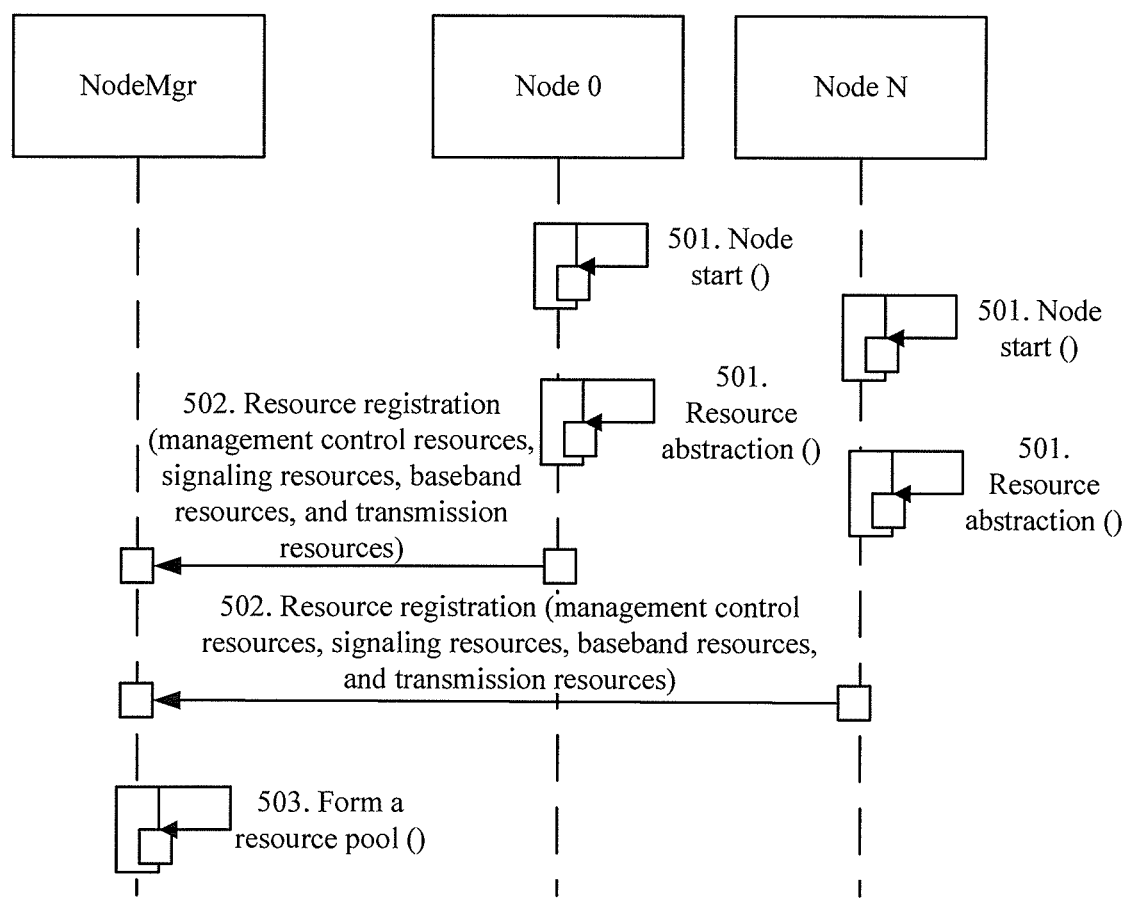
FIG. 26 is a schematic diagram of a resource abstraction and registration process in a method for managing a base station according to an embodiment of the present invention.

FIG. 26 shows a resource abstraction and registration process in a method for managing a base station according to an embodiment of the present invention. In this embodiment, two nodes are used as examples for description.

501. Nodes, after being started, abstract (or referred to as "virtualize") their computing resources and network resources into logical resources.

502. The nodes register capabilities of the logical resources with a node management device.

503. The node management device forms a resource pool by using the registered capabilities of the logical resources, and records address information nodes of which providing resources in the resource pool.

Figure 27:
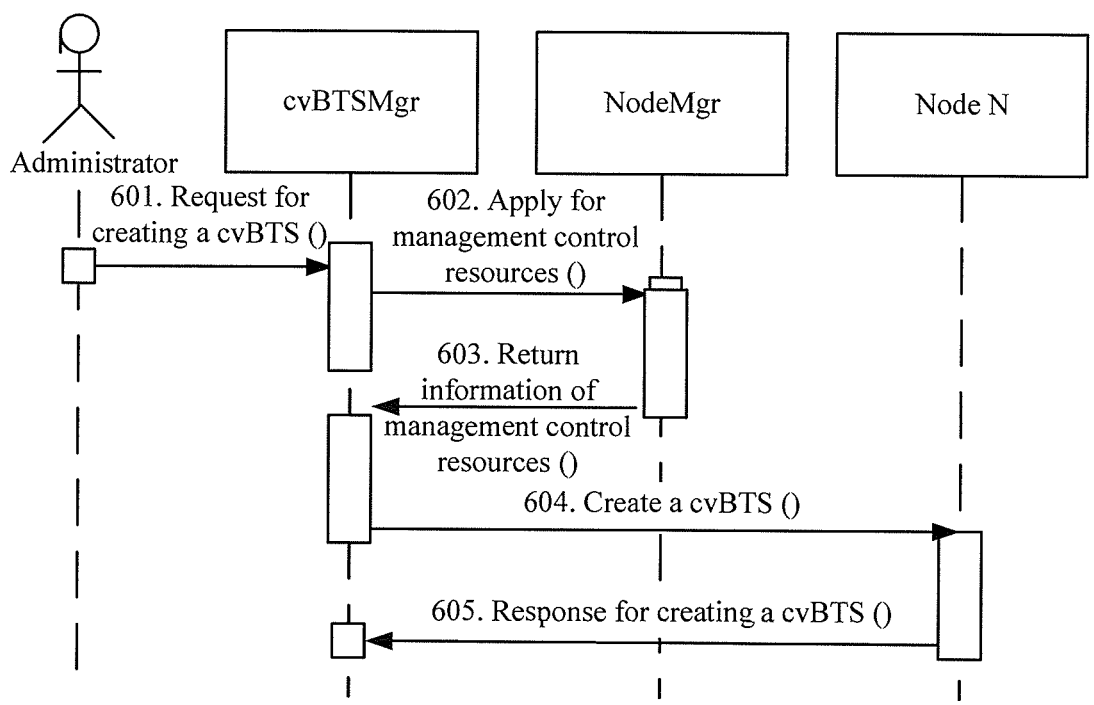
FIG. 27 is a schematic diagram of a process of creating a cloud based virtual base station in a method for managing a base station according to an embodiment of the present invention.

FIG. 27 shows a process of creating a cloud based virtual base station in a method for managing a base station according to an embodiment of the present invention.

601. A cloud based virtual base station management device receives a request for creating a cloud based virtual base station.

602. The cloud based virtual base station management device applies for management control resources from the node management device.

603. The node management device returns management control resource information to the cloud based virtual base station management device.

604. The cloud based virtual base station management device requests, after the application is successful, the node where the management control resources are located to create a cloud based virtual base station.

605. The node where the management control resources are located creates a cloud based virtual base station according to the request for creating a cloud based virtual base station, and returns a response.

Figure 28:
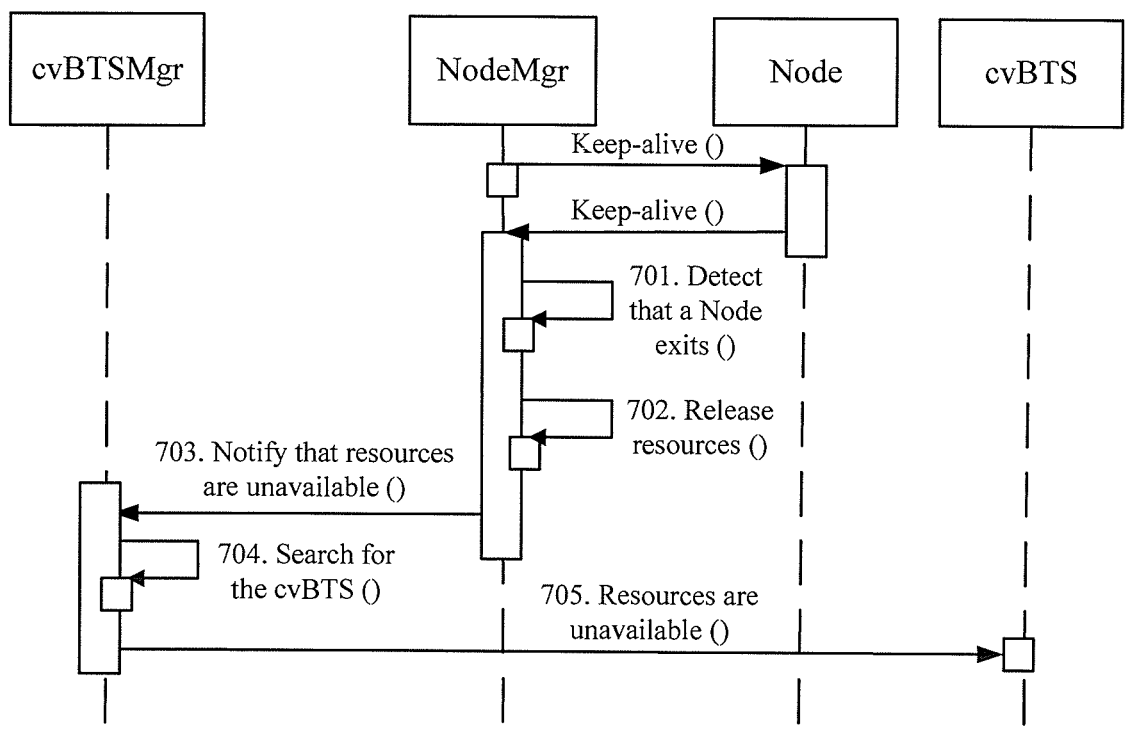
FIG. 28 is a schematic diagram of a process of deleting a node in a method for managing a base station according to an embodiment of the present invention.

FIG. 28 shows a process of deleting a node in a method for managing a base station according to an embodiment of the present invention.

701. A node management device detects that a node exits.

702. The node management device releases the resources provided by the node that exits in the resource pool.

703. Notify a cloud based virtual base station management device that the resources provide by the node that exits are unavailable.

704. The cloud based virtual base station management device searches, according to the notification, for the cloud based virtual base station which uses the resources provided by the node that exits.

705. The cloud based virtual base station management device notifies the cloud based virtual base station that the resources provide by the node that exits are unavailable.

Figure 29:
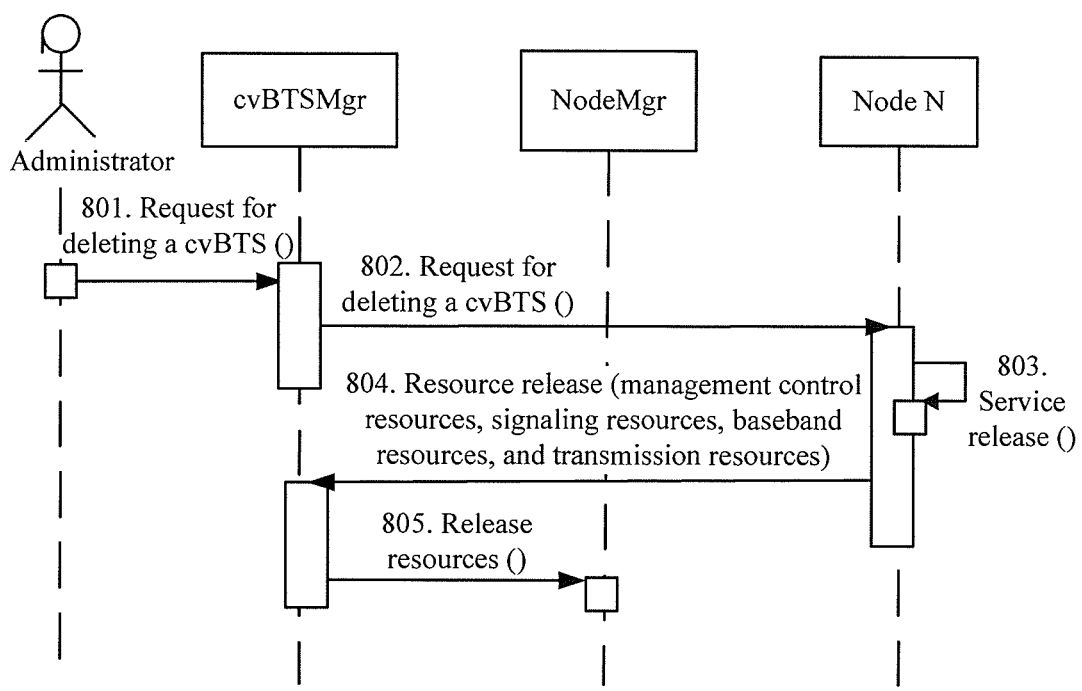
FIG. 29 is a schematic diagram of a process of deleting a cloud based virtual base station in a method for managing a base station according to an embodiment of the present invention.

FIG. 29 shows a process of deleting a cloud based virtual base station in a method for managing a base station according to an embodiment of the present invention.

801. A cloud based virtual base station management device receives a request for deleting a cloud based virtual base station.

802. The cloud based virtual base station management device notifies the node which creates the cloud based virtual base station of deleting the cloud based virtual base station.

803. The node which creates the cloud based virtual base station locally releases service resources of the cloud based virtual base station.

804. The node notifies the cloud based virtual base station management device of releasing the logical resources of the cloud based virtual base station.

805. The cloud based virtual base station management device notifies the node management device of releasing the logical resources of the cloud based virtual base station in the resource pool.

Figure 30:
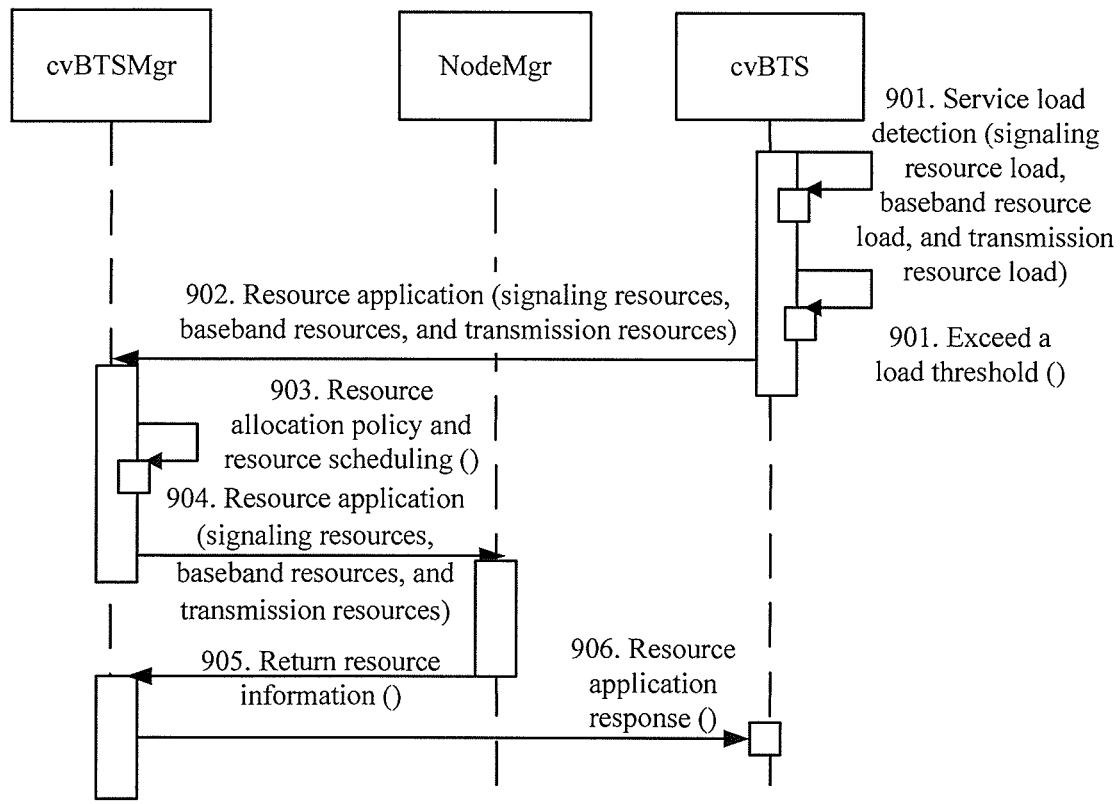
FIG. 30 is a schematic diagram of a process of applying for new resources by a cloud based virtual base station in a method for managing a base station according to an embodiment of the present invention.

FIG. 30 shows a process of applying for new resources by a cloud based virtual base station in a method for managing a base station according to an embodiment of the present invention.

901. A cloud based virtual base station detects a service is overloaded, for example, it detects that a service exceeds a load threshold.

902. The cloud based virtual base station applies for resources from a cloud based virtual base station management device.

903. The cloud based virtual base station management device generates a resource application request according to a locally stored resource scheduling policy.

904. The cloud based virtual base station management device applies for logical resources from the node management device.

905. Receive information of the applied logical resources which is returned by the node management device.

906. The cloud based virtual base station management device returns a resource application response to the cloud based virtual base station.

Figure 31:
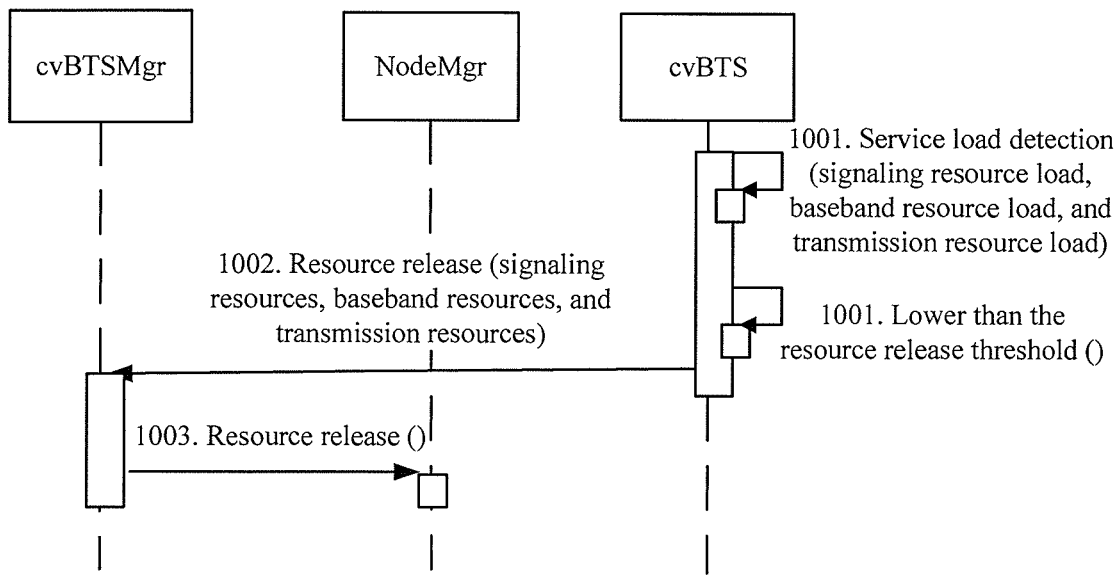
FIG. 31 is a schematic diagram of a process of releasing resources by a cloud based virtual base station in a method for managing a base station according to an embodiment of the present invention.

FIG. 31 shows a process of releasing resources by a cloud based virtual base station in a method for managing a base station according to an embodiment of the present invention.

1001. A cloud based virtual base station detects that a service is lower than a load threshold.

1002. The cloud based virtual base station sends a resource release application to a cloud based virtual base station management device.

1003. The cloud based virtual base station management device notifies, according to the resource release application, the node management device of releasing corresponding logical resources.

To conclude, it is understandable that in the embodiments of the present invention, base stations having different standards can share computing capabilities between mass base station physical resources (such as Nodes). Therefore, the overall computing capabilities of the system can be dynamically and flexibly extended according to traffic, which can well adapt to the scenario of a temporary heavy traffic impact.

It is understandable to persons of ordinary skill in the art that the embodiments provided in the three aspects of the present invention not only can independently implement specific functions and solve specific problems, but also can: for a total idea, for example, virtualize multiple node physical resources into logical resources, and allocate the logical resources to multiple cloud based virtual base stations for use through the resource pool, so that the idea that the base station system can share resource capabilities of multiple nodes can be implemented. The embodiments in each aspect of the present invention can implement the idea at different layers.

A person of ordinary skill in the art may understand that all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a Read-Only Memory (Read-Only Memory, ROM), or a Random Access Memory (Read-Only Memory, RAM).

The foregoing disclosed descriptions are merely exemplary embodiments of the present invention, but are not intended to limit the scope of the present invention. Therefore, equivalent variations made according to the claims of the present invention shall fall within the protection scope of the present invention.

What is claimed is:

1. A radio communication system, comprising:
a cloud based virtual base station platform that implements sharing of computer capabilities and network capabilities between mass nodes, configured to:
virtualize base station physical resources of nodes at a physical layer into logical resources of a resource layer, and schedule, at a resource scheduling layer, the logical resources provided by the resource layer to a cloud based virtual base station, wherein the base station physical resources comprise node computing resources and node network resources, wherein the cloud based virtual base station platform includes at least two cloud based virtual base stations implementing different standards,
assign or release node network resources to the cloud based virtual base station according to a comparison of a service load of a service of the cloud based virtual base station to a load threshold;
wherein the cloud based virtual base station is configured to provide base station services to one or more operators based on the logical resources scheduled by the cloud based virtual base station platform,
wherein the cloud based virtual base station comprises an operator identifier, and the cloud based virtual base station provides base station services to an operator according to the operator identifier,
wherein the logical resources comprise: Universal Mobile Telecommunications System (UMTS) management control resources, UMTS signaling resources, UMTS baseband resources, Long-Term Evolution (LTE) management control resources, LTE signaling resources, LTE baseband resources, Time Division Synchronous (TDS) management control resources, TDS signaling resources, and TDS baseband resources,
wherein the cloud based virtual base station detects the service exceeding the load threshold,
wherein the cloud based virtual base station applies for signaling resources, baseband resources, and transmission resources from a cloud based virtual base station management device,
and
the cloud based virtual base station management device, configured to manage the cloud based virtual base station by applying for or releasing management control resources from a node management device according to a registered capability of the logical resources of a node and requesting the node where the management control resources are located to create or delete the cloud based virtual base station.

2. The system according to claim 1, wherein one cloud based virtual base station provides base station services to only one operator.

3. The system according to claim 1, wherein one cloud based virtual base station provides base station services to multiple operators.

4. The system according to claim 1, wherein the logical resources comprise management control resources, signaling resources, baseband resources, and transmission resources, and the node computing resources include (a) general-purpose computing resources including CPU processing capabilities, memory capacity, and cache capacity, and (b) dedicated computing resources of dedicated chips.

5. The system according to claim 1, wherein:
functions of the physical layer and the resource layer of the cloud based virtual base station platform are provided by nodes in the system, wherein the nodes are computers, base transceiver stations, or other devices that have computing capabilities; and
functions of the resource scheduling layer of the cloud based virtual base station platform are provided by the node management device, wherein the node management device is deployed on the nodes or deployed on an independent server.

6. The system according to claim 5, wherein:
the cloud based virtual base station is further configured to request corresponding resources from the resource scheduling layer of the cloud based virtual base station platform according to service requirements of the operator; and
the cloud based virtual base station platform is further configured to schedule, according to the request of the cloud based virtual base station through scheduling of the resource scheduling layer, the logical resources provided by the resource layer to the cloud based virtual base station for use.

7. The system according to claim 5, wherein when the node providing resources to the cloud based virtual base station is faulty, the cloud based virtual base station platform is further configured to allocate, at the resource scheduling layer according to a resource scheduling algorithm, logical resources of other nodes provided by the resource layer, to the cloud based virtual base station.

8. A cloud based virtual base station, comprising:
a memory; and
a processor in communication with the memory, wherein the processor is configured to:
request corresponding logical resources from a resource scheduling layer of a cloud based virtual base station platform that implements sharing of computer capabilities and network capabilities between mass nodes according to service requirements, and register capabilities of the logical resources with a node management device,
compare a service load of at least one of the base station services to a load threshold,
request assignment or release of logical resources from the cloud based virtual base station based on the comparison,
receive a schedule for use of the logical resources by the cloud based virtual base station according to the request of the cloud based virtual base station through scheduling of the resource scheduling layer and from the cloud based virtual base station platform, wherein the logical resources are logical resources of a resource layer scheduled at the resource scheduling layer into which the cloud based virtual base station platform virtualizes base station physical resources of nodes at a physical layer,
provide base station services to one or more operators based on the logical resources scheduled by the cloud based virtual base station platform, wherein the base station services implement at least two different standards,
detect the service exceeding the load threshold in order to apply for signaling resources, baseband resources, and transmission resources from a cloud based virtual base station management device, and,
wherein the cloud based virtual base station comprises an operator identifier, and the cloud based virtual base station provides base station services to an operator according to the operator identifier,
wherein the logical resources comprise: Universal Mobile Telecommunications System (UMTS) management control resources, UMTS signaling resources, UMTS baseband resources, Long-Term Evolution (LTE) management control resources, LTE signaling resources, LTE baseband resources, Time Division Synchronous (TDS) management control resources, TDS signaling resources, and TDS baseband resources.

9. The cloud based virtual base station according to claim 8, wherein the processor is further configured to provide base station services to only one operator or provide base station services to multiple operators based on the logical resources scheduled by the cloud based virtual base station platform.

10. A radio communication system, comprising:
a cloud based virtual base station platform that implements sharing of computer capabilities and network capabilities between mass nodes, configured to virtualize base station physical resources of nodes at a physical layer into logical resources of a resource layer, and schedule, at a resource scheduling layer, the logical resources provided by the resource layer to a cloud based virtual base station, wherein the base station physical resources comprise node computing resources and node network resources, and the cloud based virtual base station has different standards selected from a Universal Mobile Telecommunications System (UMTS)-standard cloud based virtual base station, an Long Term Evolution (LTE)-standard cloud based virtual base station, or a time division synchronous (TDS) Code Division Multiple Access (CDMA)-standard cloud based virtual base station,
wherein the cloud based virtual base station is configured to:
provide base station services of predetermined standards based on the logical resources comprising Universal Mobile Telecommunications System (UMTS) management control resources, UMTS signaling resources, UMTS baseband resources, Long-Term Evolution (LTE) management control resources, LTE signaling resources, LTE baseband resources, Time Division Synchronous (TDS) management control resources, TDS signaling resources, and TDS baseband resources scheduled by the cloud based virtual base station platform,
include an operator identifier, and the cloud based virtual base station provides base station services to an operator according to the operator identifier,
request assignment or release of node resources according to a comparison of a service load of a service of the cloud based virtual base station to a load threshold,
detect the service exceeding the load threshold,
apply for signaling resources, baseband resources, and transmission resources from a cloud based virtual base station management device, and
the cloud based virtual base station management device, configured to manage the cloud based virtual base station by applying for or releasing management control resources from a node management device according to a registered capability of the logical resources of a node and requesting the node where the management control resources are located to create or delete the cloud based virtual base station.

11. The system according to claim 10, wherein the cloud based virtual base station comprises a cloud based virtual base station identifier attribute and a cloud based virtual base station standard identifier attribute, wherein the cloud based virtual base station identifier attribute is used to identify different cloud based virtual base stations and the cloud based virtual base station standard identifier attribute is used to identify a standard of the cloud based virtual base station.

12. The system according to claim 10, wherein the logical resources comprise management control resources, signaling resources, baseband resources, and transmission resources.

13. The system according to claim 10, wherein:
functions of the physical layer and the resource layer of the cloud based virtual base station platform are provided by nodes in the system, wherein the nodes are computers, base transceiver stations, or other devices that have computing capabilities; and
functions of the resource scheduling layer of the cloud based virtual base station platform are provided by the node management device, wherein the node management device is deployed on the nodes or deployed on an independent server.

14. The system according to claim 13, wherein:
the cloud based virtual base station is further configured to request corresponding resources from the resource scheduling layer of the cloud based virtual base station platform according to service requirements; and
the cloud based virtual base station platform is further configured to schedule, according to the request of the cloud based virtual base station through scheduling of the resource scheduling layer, the logical resources provided by the resource layer to the cloud based virtual base station for use.

15. The system according to claim 14, wherein when the node providing resources to the cloud based virtual base station is faulty, the cloud based virtual base station platform is further configured to virtualize, at the resource scheduling layer according to a resource scheduling algorithm, base station physical resources provided by other nodes in the system into logical resources, and allocate the logical resources to the cloud based virtual base station.

16. A cloud based virtual base station having a predetermined standard, the cloud based virtual base station comprising:
a memory; and a processor in communication with the memory, wherein the processor is configured to:
request corresponding logical resources from a resource scheduling layer of a cloud based virtual base station platform that implements sharing of computer capabilities and network capabilities between mass nodes according to service requirements, and register capabilities of the logical resources with a node management device,
and wherein the service requirements are determined at least according to a comparison of a service load of at least one base station service to a load threshold,
receive a schedule for use of the logical resources by the cloud based virtual base station according to the request of the cloud based virtual base station through scheduling of the resource scheduling layer and from the cloud based virtual base station platform, wherein the logical resources are logical resources of a resource layer scheduled at the resource scheduling layer into which the cloud based virtual base station platform virtualizes base station physical resources of nodes at a physical layer, and
provide the base station services of the predetermined standard based on the logical resources scheduled by the cloud based virtual base station platform, wherein the base station services implement at least two different standards,
detect the service exceeding the load threshold in order to apply for signaling resources, baseband resources, and transmission resources from a cloud based virtual base station management device,
wherein the cloud based virtual base station comprises an operator identifier, and the cloud based virtual base station provides base station services to an operator according to the operator identifier,
wherein the logical resources comprise: Universal Mobile Telecommunications System (UMTS) management control resources, UMTS signaling resources, UMTS baseband resources, Long-Term Evolution (LTE) management control resources, LTE signaling resources, LTE baseband resources, Time Division Synchronous (TDS) management control resources, TDS signaling resources, and TDS baseband resources.

17. The cloud based virtual base station according to claim 16, wherein the base station services include at least two of a UMTS-standard cloud based virtual base station, an LTE-standard cloud based virtual base station, or a TDS CDMA-standard cloud based virtual base station.

18. The radio communication system according to claim 1, wherein the cloud based virtual base station platform includes at least two of a UMTS-standard cloud based virtual base station, an LTE-standard cloud based virtual base station, or a TDS CDMA-standard cloud based virtual base station.

19. The cloud based virtual base station according to claim 8, wherein the base station services include at least two of a UMTS-standard cloud based virtual base station, an LTE-standard cloud based virtual base station, or a TDS CDMA-standard cloud based virtual base station.

* * * * *